(12) United States Patent
Walker et al.

(10) Patent No.: US 7,895,100 B2
(45) Date of Patent: Feb. 22, 2011

(54) METHOD AND APPARATUS FOR PROVIDING AND PROCESSING INSTALLMENT PLANS AT A TERMINAL

(75) Inventors: Jay S. Walker, Ridgefield, CT (US); James A. Jorasch, Stamford, CT (US); Andrew S. Van Luchene, Norwalk, CT (US)

(73) Assignee: Walker Digital, LLC, Stamford, CT (US)

( * ) Notice: Subject to any disclaimer, the term of this patent is extended or adjusted under 35 U.S.C. 154(b) by 56 days.

(21) Appl. No.: 11/425,301

(22) Filed: Jun. 20, 2006

(65) Prior Publication Data

US 2006/0229965 A1 Oct. 12, 2006

Related U.S. Application Data

(63) Continuation of application No. 10/033,691, filed on Nov. 9, 2001, now Pat. No. 7,454,381, which is a continuation of application No. 09/490,898, filed on Jan. 25, 2000, now Pat. No. 6,330,548, which is a continuation of application No. 08/946,508, filed on Oct. 7, 1997, now Pat. No. 6,064,987, which is a continuation-in-part of application No. 08/920,116, filed on Aug. 26, 1997, now Pat. No. 6,119,099, which is a continuation-in-part of application No. 08/822,709, filed on Mar. 21, 1997, now Pat. No. 6,267,670.

(51) Int. Cl.
*G06Q 40/00* (2006.01)
*G07B 17/00* (2006.01)
*G07F 19/00* (2006.01)

(52) U.S. Cl. .............................. 705/35; 705/30; 705/39

(58) Field of Classification Search .................. 705/35, 705/38–40, 26, 27, 30, 80; 235/379, 380, 235/381
See application file for complete search history.

(56) References Cited

U.S. PATENT DOCUMENTS 1,518,280 A 12/1924 Stockton (Continued)

FOREIGN PATENT DOCUMENTS

EP 0 109 189 A1 5/1984

(Continued)

OTHER PUBLICATIONS

Business Editors/Banking and Computer Writers; "Electronic Clearing HSE: American Express unit orders 1,000 more Electronic Banker Systems from Electronic Clearing House"; Apr. 18, 1991; p. 1.*

(Continued)

*Primary Examiner*—Ella Colbert
(74) *Attorney, Agent, or Firm*—Fincham Downs LLC; Michael D. Downs

(57) ABSTRACT

A central controller receives from a POS terminal a purchase price and a financial account identifier. The financial account identifier specifies a financial account, such as a credit card account. The central controller, in turn, generates one or more installment plan identifiers defining installment plans for payment of the purchase price. The installment plan identifiers are based on the purchase price and/or the financial account identifier. For example, certain accounts or certain high purchase prices may merit preferred installment plans. The installment plan identifiers are transmitted to the POS terminal. A purchaser at the POS terminal selects whether he would like to pay for his purchase in installments and, if so, using which installment plan. The POS terminal generates a selection signal indicative of whether to accept any of the installment plans, and transmits the selection signal to the central controller. The central controller receives the selection signal. If the selection signal indicates acceptance of any installment plan, use of the accepted installment plan for the financial account is authorized. Thereafter, bills are generated which reflect installment charges to be paid.

17 Claims, 20 Drawing Sheets

| CREDIT CARD ACCOUNT NUMBER 136 | PURCHASE PRICE 138 | TRANSACTION IDENTIFIER 140 | INSTALLMENT PLAN IDENTIFIER 142 | NUMBER OF PAYMENTS MADE 144 | INSTALLMENT AMOUNT 146 |
|---|---|---|---|---|---|
| 1111-3333-3333-3333 | $221.47 | 118271 | A | 9 | $20.09 |
| 1111-2222-2222-2222 | $482.61 | 128497 | A | 4 | $43.79 |
| 1111-1111-1111-1111 | $435.97 | 130456 | B | 0 | $21.14 |

U.S. PATENT DOCUMENTS

| | | | |
|---|---|---|---|
| 2,880,930 | A | 4/1959 | Werner et al. |
| 3,335,407 | A | 8/1967 | Robinson et al. |
| 3,512,709 | A | 5/1970 | Schneible et al. |
| 3,573,747 | A | 4/1971 | Adams et al. ............ 340/172.5 |
| 4,108,361 | A | 8/1978 | Krause ....................... 235/375 |
| 4,323,770 | A | 4/1982 | Dieulot et al. .............. 235/375 |
| 4,494,197 | A | 1/1985 | Troy et al. .................. 364/412 |
| 4,500,880 | A | 2/1985 | Gomersall et al. ..... 340/825.35 |
| 4,669,730 | A | 6/1987 | Small ..................... 273/138 A |
| 4,673,802 | A * | 6/1987 | Ohmae et al. .................. 705/17 |
| 4,677,553 | A | 6/1987 | Roberts et al. .............. 364/412 |
| 4,689,742 | A | 8/1987 | Troy et al. .................. 364/412 |
| 4,723,212 | A | 2/1988 | Mindrum et al. ............ 364/401 |
| 4,760,247 | A | 7/1988 | Keane et al. ................ 235/454 |
| 4,815,741 | A | 3/1989 | Small .................... 273/138 A |
| 4,825,045 | A | 4/1989 | Humble ...................... 235/383 |
| 4,839,507 | A | 6/1989 | May ............................. 235/381 |
| 4,839,804 | A | 6/1989 | Roberts et al. |
| 4,854,590 | A | 8/1989 | Jolliff et al. ............. 273/138 A |
| 4,859,838 | A | 8/1989 | Okiharu ...................... 235/383 |
| 4,876,592 | A | 10/1989 | Von Kohorn ................ 358/84 |
| 4,876,648 | A * | 10/1989 | Lloyd ........................... 705/38 |
| 4,882,473 | A | 11/1989 | Bergeron et al. ............ 235/380 |
| 4,902,880 | A | 2/1990 | Garczynski et al. ......... 235/375 |
| 4,908,761 | A | 3/1990 | Tai ............................... 364/401 |
| 4,910,672 | A | 3/1990 | Off et al. ..................... 364/405 |
| 4,922,522 | A | 5/1990 | Scanlon ........................ 379/95 |
| 4,937,853 | A | 6/1990 | Brule et al. ................... 379/96 |
| 4,947,028 | A | 8/1990 | Gorog ......................... 235/381 |
| 4,948,174 | A | 8/1990 | Thomson et al. ............. 283/58 |
| 4,973,952 | A | 11/1990 | Malec et al. ........... 340/825.35 |
| 4,974,878 | A | 12/1990 | Josephson |
| 4,982,337 | A | 1/1991 | Burr et al. ................... 364/479 |
| 4,993,714 | A | 2/1991 | Golightly ................ 273/138 A |
| 5,025,372 | A | 6/1991 | Burton et al. ............... 364/406 |
| 5,056,019 | A | 10/1991 | Schultz et al. .............. 364/405 |
| 5,119,295 | A | 6/1992 | Kapur ......................... 364/412 |
| 5,121,945 | A * | 6/1992 | Thomson et al. ............. 283/58 |
| 5,128,862 | A | 7/1992 | Mueller ....................... 364/405 |
| 5,132,914 | A | 7/1992 | Cahlander et al. ........... 364/478 |
| 5,172,328 | A | 12/1992 | Cahlander et al. ........... 364/478 |
| 5,173,851 | A | 12/1992 | Off et al. ..................... 364/401 |
| 5,177,342 | A | 1/1993 | Adams ........................ 235/379 |
| 5,192,854 | A | 3/1993 | Counts ........................ 235/375 |
| 5,201,010 | A | 4/1993 | Deaton et al. .................. 382/7 |
| 5,216,595 | A | 6/1993 | Protheroe ................... 364/412 |
| 5,220,501 | A | 6/1993 | Lawlor et al. ............... 364/408 |
| 5,223,698 | A | 6/1993 | Kapur ......................... 235/375 |
| 5,231,569 | A | 7/1993 | Myatt et al. ................. 364/408 |
| 5,239,165 | A | 8/1993 | Novak ......................... 235/375 |
| 5,243,515 | A | 9/1993 | Lee .............................. 364/401 |
| 5,245,533 | A | 9/1993 | Marshall ..................... 364/401 |
| 5,256,863 | A | 10/1993 | Ferguson et al. ............ 235/383 |
| 5,262,941 | A | 11/1993 | Saladin et al. .............. 364/408 |
| 5,274,547 | A | 12/1993 | Zoffel et al. ................ 364/408 |
| 5,283,731 | A | 2/1994 | Lalonde et al. ............. 364/401 |
| 5,287,268 | A | 2/1994 | McCarthy ................... 364/405 |
| 5,297,026 | A | 3/1994 | Hoffman ..................... 364/408 |
| 5,297,031 | A | 3/1994 | Gutterman et al. .......... 364/408 |
| 5,302,811 | A | 4/1994 | Fukatsu ....................... 235/381 |
| 5,305,195 | A | 4/1994 | Murphy ....................... 364/401 |
| 5,309,355 | A | 5/1994 | Lockwood .................. 364/401 |
| 5,353,218 | A | 10/1994 | De Lapa et al. ............. 364/401 |
| 5,353,219 | A | 10/1994 | Mueller et al. .............. 364/405 |
| 5,371,796 | A | 12/1994 | Avarne ........................ 380/23 |
| 5,380,991 | A | 1/1995 | Valencia et al. ............. 235/383 |
| 5,383,113 | A | 1/1995 | Kight et al. ................. 364/401 |
| RE34,915 | E | 4/1995 | Nichtberger et al. ........ 364/401 |
| 5,420,606 | A | 5/1995 | Begum et al. ............... 345/156 |
| 5,459,306 | A | 10/1995 | Stein et al. .................. 235/383 |
| 5,481,094 | A | 1/1996 | Suda ........................... 235/383 |
| 5,504,475 | A | 4/1996 | Houdou et al. .......... 340/825.35 |
| 5,510,979 | A | 4/1996 | Moderi et al. ............... 364/405 |
| 5,539,189 | A | 7/1996 | Wilson ........................ 235/379 |
| 5,564,546 | A | 10/1996 | Molbak et al. .............. 194/216 |
| 5,572,653 | A | 11/1996 | DeTemple et al. .......... 395/501 |
| 5,581,064 | A | 12/1996 | Riley et al. .................. 235/383 |
| 5,592,375 | A | 1/1997 | Salmon et al. .............. 395/207 |
| 5,592,376 | A | 1/1997 | Hodroff ....................... 395/214 |
| 5,602,377 | A | 2/1997 | Beller et al. ................. 235/462 |
| 5,611,052 | A | 3/1997 | Dykstra et al. .............. 395/238 |
| 5,612,868 | A | 3/1997 | Off et al. ..................... 364/214 |
| 5,615,269 | A | 3/1997 | Micali .......................... 380/49 |
| 5,619,558 | A | 4/1997 | Jheeta .......................... 379/90 |
| 5,620,079 | A | 4/1997 | Molbak ....................... 194/217 |
| 5,621,201 | A | 4/1997 | Langhans et al. ........... 235/380 |
| 5,621,640 | A | 4/1997 | Burke .......................... 395/214 |
| 5,632,010 | A | 5/1997 | Briechle et al. ............... 345/1 |
| 5,638,457 | A | 6/1997 | Deaton et al. ............... 382/100 |
| 5,642,484 | A | 6/1997 | Harrison, III et al. ........ 395/214 |
| 5,642,485 | A | 6/1997 | Deaton et al. ............... 395/214 |
| 5,644,723 | A | 7/1997 | Deaton et al. ............... 395/214 |
| 5,649,114 | A | 7/1997 | Deaton et al. ............... 395/214 |
| 5,652,421 | A | 7/1997 | Veeneman et al. .......... 235/381 |
| 5,655,007 | A | 8/1997 | McAllister ............... 379/91.01 |
| 5,664,115 | A | 9/1997 | Fraser .......................... 705/37 |
| 5,665,953 | A | 9/1997 | Mazzamuto et al. ........ 235/383 |
| 5,699,528 | A | 12/1997 | Hogan |
| 5,715,314 | A | 2/1998 | Payne et al. .................. 380/24 |
| 5,724,424 | A | 3/1998 | Gifford ........................ 380/24 |
| 5,724,886 | A | 3/1998 | Ewald et al. .................. 99/374 |
| 5,727,249 | A | 3/1998 | Pollin .......................... 705/40 |
| 5,754,655 | A | 5/1998 | Hughes et al. ............... 380/24 |
| 5,809,144 | A | 9/1998 | Sirbu et al. .................... 380/25 |
| 5,832,457 | A | 11/1998 | O'Brien et al. ............... 705/14 |
| 5,845,259 | A | 12/1998 | West et al. .................... 705/14 |
| 5,852,811 | A | 12/1998 | Atkins |
| 5,878,405 | A | 3/1999 | Grant et al. .................. 705/39 |
| 5,890,718 | A | 4/1999 | Byon .......................... 273/459 |
| 5,903,879 | A | 5/1999 | Mitchell ....................... 705/38 |
| 5,933,817 | A | 8/1999 | Hucal |
| 5,946,665 | A | 8/1999 | Suzuki et al. ................. 705/26 |
| 5,970,469 | A | 10/1999 | Scroggie et al. .............. 705/14 |
| 6,014,634 | A | 1/2000 | Scroggie et al. .............. 705/14 |
| 6,064,987 | A | 5/2000 | Walker et al. ................. 705/38 |
| 6,070,150 | A | 5/2000 | Remington et al. |
| 6,112,191 | A * | 8/2000 | Burke .......................... 705/41 |
| 6,119,099 | A | 9/2000 | Walker et al. ................. 705/16 |
| 6,267,670 | B1 | 7/2001 | Walker et al. ................ 463/17 |
| 6,980,968 | B1 | 12/2005 | Walker et al. |

FOREIGN PATENT DOCUMENTS

| | | |
|---|---|---|
| EP | 512413 | 11/1992 |
| JP | 60-251498 | 12/1985 |
| JP | HEI1-263670 | 11/1990 |
| JP | 5242363 | 9/1993 |
| JP | 2002008135 | 1/2002 |
| WO | WO 96/36926 | 11/1996 |
| WO | WO 97/35441 | 9/1997 |

OTHER PUBLICATIONS

Labat, Robert D.; Life Association News; "A Tax Shelter on the Instalment Plan"; vol. 75, iss. 1; Jan. 1980;pp. 1 and 2.*

"Cape Town", Reuters Ltd., Nov. 8, 1979, 1pg.

"Save the Mark", Financial Times (London), Feb. 1, 1993, p. 12, 1pg.

Cook, Louise, "Consumer Watch: Clip, Snip, Save", The Associated Press, Mar. 12, 1984, Section: Business News, 2pp.

Greene, Jan, "Farm Bills Please Assns; National Grocers Association", Supermarket News, Dec. 23, 1985, vol. 35, p. 6, ISSN: 0039-5803, 1pg.

"POS Spectrum: A Lottery Looks to POS for Growth," POS News, Jan. 1989, vol. 5, No. 7, p. 8, ISSN: 0896-6230, CODEN: Bhorad, 1pg.

Kuttner, Robert, "Computers May Turn the World into One Big Commodities Pit," Business Week, Sep. 11, 1989, Section: Economic Viewpoint, No. 3123, p. 17, 3pp.

Schrage, Michael, "An Experiment in Economic Theory; Labs Testing Real Markets" The Record, Nov. 26, 1989, Section: Business, p. B01, 3pp.

"Let's Play the Cash Register Receipts Lottery" The New York Times, Dec. 25, 1990, Section 1, p. 30, Col. 4, Editorial Desk, 1pg.

Del Rosso, Laura, "Marketel says it plans to launch air fare 'auction' in June; Marketel International Inc.", Travel Weekly, Apr. 29, 1991, vol. 50, No. 34, p. 1, ISSN: 0041-2082.

"Phillips offers customers financing through Citicorp; Philips Medical Systems North America, Citicorp North America Inc.", Health Industry Today, Jun. 1991, vol. 54, No. 6, p. 4, ISSN: 0745-4678, 1pg.

Pelline, Jeff, "Travelers Bidding on Airline Tickets SF firm offers chance for cut-rate fares", The San Francisco Chronicle Aug. 19, 1991, Section: News, p. A4, 5pp.

Del Rosso, Laura, "Ticket-Bidding Firm Closes its Doors; Marketel International; Brief Article", Travel Weekly, Mar. 12, 1992, vol. 51, No. 21, p. 1, ISSN: 0041-2082, 3pp.

"Coupons Get Serious; Supermarkets Use Barcodes to Prevent Misredemptions", Lebhar-Friedman Inc., Oct. 1992, vol. 68; No. 10; p. 68, ISSN:0193-1199, 2pp.

"Winn-Dixie/ The Salvation Army Report Contributions for War Against Hunger", PR Newswire, Jun. 10, 1993, 1pg.

Jones, Jeanne, "Data Readers Streamline Management; Scanner Technology Aids Retailers as Well as Plants, Wholesalers", The Houston Post, Jun. 26, 1994, p. D1, 4pp.

Fiorini, Phillip, "No Place for Penny?' / Smallest Coin Doesn't Make Cents to Some", USA Today, Jul. 29, 1994, Section: News, p. 1A, 2pp.

Smith, Alison, "Survey of UK Consumer credit and Asset Finance", Financial Times, Nov. 3, 1994, p. VI, 3pp.

Andreoli, Tom et al., "Cash Machines Offer a Whole Lotto Money for Withdrawal; An Unfortunate Juxtaposition; Block That Metaphor!; Something Street Talk; Fishy in Springfield; State Street Sears?; Champion As underdog; A 'Whole Language' Graduate", Crain's Chicago Business, Jun. 19, 1995, Section: News, p. 8, 2pp.

"Spain: BBV Launches New Card", Cards International, Jun. 22, 1995, p. 5, 1pg.

Knippenberg, Jim, "Psst! Will Local Radio Empires Strike Back?", The Cincinnati Enquirer, Jul. 23, 1995, Section: Tempo, p. F01, 1pg.

Lunt, Penny, "Payments on the Net? How Many? How Safe?", ABA Banking Journal, Nov. 1995, vol. 87, No. 11, pp. 46-54, ISSN: 0194-5947, 8pp.

"Cyber Bid", Net Fun Ltd., Copyright 1996, 9pp.

Avery, Robert B. et al., "Credit Risk, Credit Scoring, and the Performance of Home Mortgages", Federal Reserve Bulletin, Jul. 1996, vol. 82, No. 7, pp. 621-648, ISSN: 0014-9209, 22pp.

Hadley, Kimberly, "Pastors Praying Anti-Arson Effort Will Burn Bias", The Nashville Banner, Jul. 26, 1996, Section: News, p. A13, 1pg.

Gapper, John, "NatWest Reports Rise in Bad Debt", Financial Times, Jul. 31, 1996, Section: News: UK, p. 9, 1pg.

"Lynx Technology: Lynx to Provide Business Leasing Programme Through Schroder Leasing", M2 Presswire, Aug. 9, 1996, 2pp.

Taylor, Paul, "Towards a Dream Market", Financial Times (London), Sep. 4, 1996, Section: Survey -FT IT, p. 3, 2pp.

Bonnici, Joseph et al., "Consumer Issues in Coupon Usage: An Exploratory Analysis", Journal of Applied Business Research, Winter 1996/97, vol. 13, No. 1, pp. 31-40. ISSN: 0892-7626, 11pp.

Lucas, Peter, "Getting Around to Recurring Payments", Credit Card Management, Jan. 1997, vol. 9, No. 10, p. 52-57, ISSN: 0896-9329, 5pp.

Rehayem, Gilbert, "Opinion: X-Press Betting", La Fleur's Lottery World, Feb. 7, 1997, p. 4, 1pg.

"Mobil Claims to Have The Key to Speedy Card Transactions", Credit Card News, Mar. 1, 1997, p. 6, 2pp.

Singletary, Michelle, "Electronic World, Unchecked Problem? U.S. Move to Paperless Payments Raises Worries About Those Who Don't Use Banks" The Washington Post, Mar. 4, 1997, Section: Financial, p. C01, 3pp.

"AVCO Financial Services.", (http //www homefurnish com/NHFA/ avco htm), download date: May 23, 1997, 2pp.

"Products and Services: Checkout Direct", (http //catalinamktg com/ prodcdir htm) download date: May 29, 1997, 2pp.

Riordan, Teresa, "Patents; A Novel Approach to Making a Better Spermicide Harks Back to Some Old-Fashioned Methods." The New York Times, Jun. 9, 1997, Section D, p. 2, Col. 1, Business/Financial Desk, 3pp.

Nairn, Geoff, "The Key to Your Identity: Falling costs will Allow Fingerprint Verification to be Widely Used", Financial Times (London), Jul. 15, 1997, Section: Technology, p. 12, 3pp.

"How It All Works" The United Computer Exchange, (http //www uce com/howitworks htm), download date: Jul. 23, 1997, 5pp.

"About Us: Classifieds2000: The Internet Classifieds", (http //www classifieds2000 com/cgi-cls/Display exe?C2K+aboutus), download date: Aug. 6, 1997, 3pp.

"Tradingfloor.com: General Trading Information and Terms provided by TradingFloor.com", (http //www tradingfloor com/info htm), download date: Aug. 14, 1997, pp. 1-11 (11pp.).

"NASDAQ: What is Nasdaq?", (http //home axford com/corfin/corfl 1 htm), download date: Aug. 15, 1997, 3pp.

Prochaska-Cue, Kathy, "Acquiring Credit", (http //ianrww unl edu/ IANR/PUBS/NEBFACTS/NF91-2 HTM), download date: Sep. 3, 1997, 3pp.

"About IAO", Interactive Auction Online, (http //www iaoauction com/about htm) download date: Sep. 8, 1997, 10pp.

"Onsale auction Supersite™", Onsale, Inc., (http //www onsale com), download date: Sep. 8, 1997, 15pp.

Kelsey, John et al., "Conditional Purchase Orders", 4th ACM Conference on Computer and Communications Security, Apr. 1997, 8pp.

"Introducing the Digital MenuBoard ™" Siren Technologies Inc., (www sirentech com), 4pp.

McAllister, Liane, "Planning for Christmas profits. (includes 26 ways to sell Christmas)", Gifts & Decorative Accessories, May 1993, vol. 94, No. 5, pp. 46(5), ISSN: 0016-9889, 9pp.

"Cellular wrong signals", Newsday, Jul. 22, 1993, p. 39, ISSN: 0278-5587, 1pp.

Ellis, Stephen, "Credit card firms drive down costs", Sunday Times, Feb. 27, 1994, 4pp.

Fickenscher, Lisa, "Start-up card outfit has installment plan for hospital bills.", American Banker, Jul. 21, 1995, vol. 160, No. 139, pp. 12(1), ISSN: 0002-7561, 2pp.

Mckinney, Jeff, "Merchant program could pay off for Provident", The Cincinnati Enquirer, Mar. 24, 1996, Section: Financial, p. E02, 2pp.

Poteshman, Mel, "There are options available if you can't pay the IRS what you owe.", Los Angeles Business Journal, Apr. 8, 1996, vol. 18, No. 15, pp. 21(1), ISSN: 0194-2603, 2pp.

Fickenscher, Lisa, "Amex to Start Free Rewards Program with Discounts on Merchandise", The American Banker, Oct. 18, 1996, Section: Credit/Debit/ATMs, p. 10, 2pp.

Fitzgerald, Kate, "Amex program moves loyalty to next level: Custom extras finds a medium customers can't ignore: Billing Statements", Advertising Age, Nov. 4, 1996, Section: News, p. 2, 2pp.

"Dispensing the future", Electronic Payments International, May 1997, Section: Feature, p. 12, 5pp.

Hoeschen, Brad, "Brookfield Square hopes mall card strikes a chord", Business Journal-Milwaukee, Sep. 12, 1997, vol. 14, No. 50, p. 19, 2pp.

Website: "NCR 7452 Workstation—Beyond Traditional POS", (http //www ncr com/product/retail/products/catalog/7452 shtm), download date: Sep. 23, 1997, 3pp.

Brochure, "NCR 7453 PC-Based Point-of-Sale Solution", NCR Corporation, Copyright 1998, 2pp.

PCT International Search Report for Application No. PCT/US98/ 05787, dated May 12, 1999, 2pp.

PCT Written Opinion for Application No. PCT/US98/05787, dated Jul. 29, 1999, 12pp.

Gifis, Steven H. "Legal Guides Law Dictionary", *Barron's Educational Series, Inc.*, 1984, pp. 114-117 and 340-341, 5pp.

"Reaching Out in New Directions"; Introducing U$A Value Exchange, First Data Corporation Brochure, 1996-1997, 32pp.

"Paying for college on the installment plan.", Changing Times, Nov. 1984, vol. 38, pp. 37, 3pp..

Oetzel, Karen "More than what's coming to you; many executives can earn significant extra pay (incentive pay and bonus plans)", Credit Union Executive, Summer 1990, vol. 30, No. 2, pp. 16 ISSN: 0011-1058, 5pp.

"Industry Briefs", Card News, Phillips Business Information, Inc.; vol. 12, No. 11, Jun. 9, 1997, 2pp.

Hisey, Pete "The money-making side of Sears", Credit Card Management, vol. 9, No. 12, Mar. 1997, p. 24-30 (7pp.).

Beers, William, OneVision Focuses On Enterprise Management, AT&T Technology. Summer 1995, 4 pp.

Credit Card Mini Lesson, Dale Carnegie & Associates, 1996, 54 pp.

Understanding Credit Card Costs, Consumer Action, 1996, 7 pp.

Lamond, Keith, "Credit Card Transactions: Real World and Online", 33 pp.

Collins, Clare, "Watch Your Step Zero-Percent Financing Plans Can Lead To Nothing But Trouble For Unwary Consumers", Chicago Tribune, Apr. 20, 1995, 3 pp.

"Can You Afford To Send Them To College?", Changing Times, Mar. 1957, 4 pp.

Geyer, Anne "Credit Card Surge", Jun. 1991, 4 pp.

Silverman, Gene, "Planning and Using Infomercial Campaigns Effectively", Direct Marketing, Sep. 1995, 4 pp.

Symons, Allene "Lucky, Say-On Debut Rewards Card", Drug Store News, Feb. 17, 1997.

McKeveny, Alexander, "Giving Them a Good Reason", Mar. 1997, 5 pp.

Bigger Plans — Provident Bank, issuer of MeritValue customer loyalty card, plans to offer program in 25 cities in 6 months, Oct. 7, 1996, 1 pg.

Buy Now, Pay Later, Catalog Age, Feb. 1992, 1 pg.

Notice of Allowance for U.S. Appl. No. 08/946,508, mailed Oct. 25, 1999, 3 pp.

Office Action for U.S. Appl. No. 08/946,508 mailed Mar. 3, 1999, 6 pp.

Notice of Allowability for U.S. Appl. No. 09/264,379 mailed Aug. 11 2001, 3 pp.

Notice of Allowability for U.S. Appl. No. 09/264,379 mailed Jun. 1, 2001, 4 pp.

Notice of Allowance for U.S. Appl. No. 09/654,341, mailed Nov. 4, 2004, 6 pp.

Office Action for U.S. Appl. No. 09/654,341, mailed Oct. 3, 2003, 7 pp.

Office Action for U.S. Appl. No. 09/654,341, mailed Mar. 24, 2003, 8 pp.

Office Action for U.S. Appl. No. 09/654,341, mailed Aug. 6, 2002, 5 pp.

Notice of Allowability for U.S. Appl. No. 09/490,898 mailed Sep. 7, 2001, 5 pp.

Office Action for U.S. Appl. No. 09/490,898 mailed Oct. 13, 2000, 15 pp.

Office Action for U.S. Appl. No. 09/490,898 mailed Sep. 7, 2001, 7 pp.

Notice of Allowance for U.S. Appl. No. 10/033,691 mailed Sep. 30, 2008. 17 pp.

Office Action for U.S. Appl. No. 10/033,691 mailed Oct. 18, 2007, 8 pp.

Office Action for U.S. Appl. No. 10/033,691 mailed Apr. 11, 2007, 5 pp.

Office Action for U.S. Appl. No. 11/425,307 mailed Dec. 5, 2008, 13 pp.

Office Action for U.S. Appl. No. 11/425,307 mailed Mar. 21, 2008, 10 pp.

Office Action for U.S. Appl. No. 11/425,293 mailed May 29, 2008, 13 pp.

Office Action for U.S. Appl. No. 11/425,293 mailed Apr. 30, 2007, 5 pp.

* cited by examiner

| CREDIT CARD ACCOUNT NUMBER 60 | NAME 61 | ADDRESS 62 | BALANCE LIMIT 63 | BALANCE 64 |
|---|---|---|---|---|
| 1111-1111-1111-1111 | BILL SMITH | 123 RED ST. ANYWHERE, USA | $2,000 | $1,016.94 |
| 1111-2222-2222-2222 | SUSAN GREEN | 456 BLUE ST. ANYWHERE, USA | $4,000 | $3,120.48 |
| 1111-3333-3333-3333 | ELIOT BROWN | 678 GRAY DR. ANYWHERE, USA | $1,000 | $90.32 |

FIG. 5A

| TRANSACTION IDENTIFIER 76 | CREDIT CARD ACCOUNT NUMBER 78 | TRANSACTION DATE 80 | INSTALLMENT PLAN IDENTIFIER 82 | MERCHANT IDENTIFIER 84 | PURCHASE PRICE 86 |
|---|---|---|---|---|---|
| 130112 | 1111-8888-8888-8888 | 8/23/97 | NONE | 13456 | $62.29 |
| 130113 | 1111-5555-5555-5555 | 8/23/97 | A | 12421 | $82.51 |
| 130456 | 1111-1111-1111-1111 | 8/23/97 | B | 12456 | $435.97 |

FIG. 5B

| INSTALLMENT PLAN IDENTIFIER 96 | TERM 98 | INTEREST RATE 100 | REQUIRED PURCHASE PRICE 102 |
|---|---|---|---|
| A | 12 MONTHS | 16% | BETWEEN $250 AND $1,000 |
| B | 24 MONTHS | 15% | BETWEEN $250 AND $1,000 |
| C | 36 MONTHS | 13% | BETWEEN $250 AND $1,000 |

| CREDIT CARD ACCOUNT NUMBER 1111-1111-1111-1111 | | | | |
|---|---|---|---|---|
| TRANSACTION IDENTIFIER 116 | TRANSACTION DATE 118 | BILLABLE CHARGE 120 | MERCHANT IDENTIFIER 122 | TRANSACTION DESCRIPTION 124 |
| 128003 | 8/21/97 | $32.81 | 12345 | MISC. GROCERIES |
| 128116 | 8/22/97 | $12.92 | 12348 | GASOLINE |
| 130456-B-1 | 8/28/97 | $21.14 | NA | COLOR TELEVISION 456 PAYMENT 1/24 |

FIG. 5D

| CREDIT CARD ACCOUNT NUMBER 136 | PURCHASE PRICE 138 | TRANSACTION IDENTIFIER 140 | INSTALLMENT PLAN IDENTIFIER 142 | NUMBER OF PAYMENTS MADE 144 | INSTALLMENT AMOUNT 146 |
|---|---|---|---|---|---|
| 1111-3333-3333-3333 | $221.47 | 118271 | A | 9 | $20.09 |
| 1111-2222-2222-2222 | $482.61 | 128497 | A | 4 | $43.79 |
| 1111-1111-1111-1111 | $435.97 | 130456 | B | 0 | $21.14 |

130 → (row 1)
132 → (row 2)
134 → (row 3)

| MERCHANT IDENTIFIER 156 | MERCHANT NAME 158 | ADDRESS 160 |
|---|---|---|
| 12456 | RETAIL STORE X | 4820 RED ST. ANYWHERE, USA |
| 12457 | GROCER Y | 7221 AZURE LA. ANYWHERE, USA |
| 12458 | GASOLINE SUPPLIER Z | 4281 GREEN STRIP DR. ANYWHERE, USA |

STATEMENT

DATE 9/15/97     FINANCE PLAN MINIMUM PAYMENT: $21.14 — 410
                 CREDIT LINE BALANCE
                 MINIMUM PAYMENT:              $24.00 — 412
                 TOTAL MINIMUM PAYMENT DUE:    $45.14

PAYMENT DUE:           10/1/97  — 408

CUSTOMER: BILL SMITH
ACCOUNT NUMBER: 1111-1111-1111-1111

YOUR CHARGES THIS PERIOD: — 402

| | | | |
|---|---|---|---|
| 128003 | 8/21/97 SHOP RITE | MISC. GROCERIES | $32.81 — 404 |
| 128116 | 8/22/97 EXXON | GASOLINE | $12.92 |
| 130456-B-1 | 8/28/97 FINANCE PLAN | TELEVISION 456 PAYMENT 1/24 | $21.14 — 406 |
| | | TOTAL | $66.87 |

FIG. 12

METHOD AND APPARATUS FOR PROVIDING AND PROCESSING INSTALLMENT PLANS AT A TERMINAL

The present application is a continuation of U.S. patent application Ser. No. 10/033,691, entitled "METHOD AND APPARATUS FOR PROVIDING AND PROCESSING INSTALLMENT PLANS AT A TERMINAL", filed Nov. 9, 2001 and issued as U.S. Pat. No. 7,454,381 on Nov. 18, 2008;

which is a continuation of U.S. patent application Ser. No. 09/490,898, entitled "METHOD AND APPARATUS FOR PROVIDING AND PROCESSING INSTALLMENT PLANS AT A TERMINAL", filed Jan. 25, 2000 and issued as U.S. Pat. No. 6,330,548 on Dec. 11, 2001;

which is a continuation of U.S. patent application Ser. No. 08/946,508, entitled "METHOD AND APPARATUS FOR PROVIDING AND PROCESSING INSTALLMENT PLANS AT A TERMINAL", filed on Oct. 7, 1997 and issued as U.S. Pat. No. 6,064,987 on May 16, 2000;

which is a continuation-in-part of U.S. patent application Ser. No. 08/920,116, entitled "METHOD AND APPARATUS FOR PROCESSING SUPPLEMENTARY PRODUCT SALES AT A POINT-OF-SALE TERMINAL", filed on Aug. 26, 1997 and issued as U.S. Pat. No. 6,119,099 on Sep. 12, 2000;

which is a continuation-in-part of U.S. patent application Ser. No. 08/822,709, entitled "SYSTEM AND METHOD FOR PERFORMING LOTTERY TICKET TRANSACTIONS UTILIZING POINT-OF-SALE TERMINALS", filed on Mar. 21, 1997 and issued as U.S. Pat. No. 6,267,670 on Jul. 31, 2001.

This application is related to U.S. patent application Ser. No. 11/425,307, filed on Jun. 20, 2006, and to U.S. patent application Ser. No. 11/425,293 filed on Jun. 20, 2006.

FIELD OF THE INVENTION

The present invention relates to methods and apparatus for providing and processing installment plan options.

BACKGROUND OF THE INVENTION

Many purchasers are often unable or unwilling to pay for a desired purchase. The purchase may be, for example, a single high-priced item or a number of lower-priced items that together have a high purchase price. Unfortunately, the purchase price may be more than the purchaser is able or willing to spend at the time of sale.

Credit card accounts can allow greater flexibility in paying for purchases. When a purchase is paid for with a credit card, the purchaser need not tender cash or otherwise immediately forego money. Instead, the purchaser must pay the issuer of the credit card account within a predetermined period of time. Credit card accounts thereby allow purchasers to incur costs greater than those they are able to pay at the time of sale.

Costs that are "charged" (paid for using a credit card account) are added to a "balance" of the account. The purchaser may pay the balance with a single payment or in several smaller payments made over a period of time. Many purchasers prefer paying several smaller payments, instead of a single, larger payment. In return for allowing the purchaser to pay over a period of time, the issuer imposes interest on the balance. Typically, the balance is incremented by a predetermined interest rate at regular intervals, such as each month. In summary, payment amounts are subtracted from the balance, while interest and additional charged costs are added to the balance.

Each credit card account typically has a balance limit that is set by the issuer in order to deter or prevent a purchaser from incurring an unduly high balance. Exceeding the balance limit may not be allowed, or may impose a substantial penalty fee. Without such a balance limit, a purchaser may charge so many costs that the balance becomes unduly high. Consequently, the purchaser may not be able or willing to pay for the balance, and thus the issuer will not receive payments that are due.

The restrictions imposed by the balance limit are another reason why many purchasers are often unable or unwilling to pay for a desired purchase. Many purchasers are reluctant to maintain a balance that is near the balance limit, for fear of exceeding the balance limit. In addition, the purchaser may worry that a necessary but unanticipated purchase may not be allowed. For example, if a credit card account has a balance limit of $5,000 and a balance of $4,500, an "emergency" purchase of $1000 may not be allowed if exceeding the balance limit is forbidden.

Some sellers allow selected items to be paid for in a number of periodic payments ("installments"), rather than in one payment at the time of sale, as is more common. In return, the seller typically imposes a rate of interest on the purchase price, and interest thereby forms a part of each installment payment. For example, a seller may allow purchasers to pay for a $100 item with three installments of $35 per month. The seller receives 3×$35=$105 after the three installments are paid, which represents the $100 purchase price and $5 interest. Such smaller periodic payments are preferable to many purchasers, who may not be able to pay a single large payment.

Unfortunately, such installment-type payment plans ("installment plans") suffer from several drawbacks. For example, a seller must be assured that a purchaser is financially reliable, otherwise one or more installments may not be received. Therefore, the purchaser typically must obtain and complete a credit application, undergo a credit check and await credit approval, which is annoying and inconvenient to the purchaser.

The seller is likewise inconvenienced by establishing such installment plans, processing credit applications, policing nonpayment of installments and incurring various other expenses. It is inconvenient to bill each month, and economically unfeasible to bill each month for small amounts. In addition, it is difficult for a seller to collect bad debt (unpaid installments), especially since most sellers are not accustomed to collecting bad debt.

Overall, such installment plans can be expensive for the seller and annoying to the purchaser. Consequently, not all sellers allow installment payments, and those that do typically allow installment payments only for a limited selection of high-priced items, rather than for each item. Sellers rarely, if ever, allow installment payments on lower-priced purchases since the benefits to the seller are believed to be outweighed by the costs.

Banco Bilbao Vizcayo ("BBV") is a credit card issuer that allows some purchasers to pay their account balances in installments. A purchaser negotiates via telephone with a BBV representative to establish an acceptable installment plan, if possible, at a time after purchases are paid for. Since the installment plan is established after purchases are paid for, the purchaser does not know at the time of sale whether installment payments will even be allowed. In addition, the purchaser does not know at the time of sale what interest rate will be applied if installment payments are allowed. Consequently, at the time of sale the purchaser may not be able to determine whether the purchase price is acceptable, even with an installment plan. In summary, negotiating with BBV to pay for an existing balance in installments cannot permit purchasers to make informed purchasing decisions at the time of sale.

Many banks provide loans, wherein the loan may be used to pay for various purchases. Such loans are typically repaid in fixed installments. Unfortunately, requesting and obtaining such loans is expensive and time-consuming, and loans may not be dispensed frequently. In addition, interest accumulates on the entire loan amount, so it is not efficient to use such loans to pay for frequent and varying purchases.

Some credit card issuers offer pre-approved loans in which installment payments of the loan are applied to the credit card account balance. Such pre-approved loans are typically offered only to purchasers with strong credit histories. In addition, the offered loan is typically a large amount of money, such as thousands of dollars. Thus, as described above, it is not efficient to use such loans to pay for frequent and varying purchases. Accordingly, the usefulness of such a loan is limited for smaller purchase prices.

It would be advantageous to provide a method and apparatus that allowed purchasers to pay for a variety of purchases in installments. Such a method and apparatus would ideally overcome the drawbacks of known installment plans.

SUMMARY OF THE INVENTION

It is an object of the present invention to provide methods and apparatus for allowing purchasers to select an installment plan for purchases at a time of sale.

In accordance with the present invention, a central controller receives from a POS terminal a purchase price and a financial account identifier. The financial account identifier specifies a financial account, such as a credit card account. The central controller, in turn, generates one or more installment plan identifiers indicating installment plans for payment of the purchase price. The installment plan identifiers are based on the purchase price and/or the financial account identifier. For example, certain accounts or certain high purchase prices may merit preferred installment plans. The installment plan identifiers are transmitted to the POS terminal.

A purchaser at the POS terminal selects whether he would like to pay for his purchase in installments and, if so, using which installment plan. The POS terminal generates a selection signal indicative of whether to accept any of the installment plans. In other words, the selection signal indicates a selected one of the installments plans (if the purchaser desires to pay in installments) or that no installment plan was selected. The POS terminal then transmits the selection signal to the central controller.

The central controller receives the selection signal. If the selection signal indicates acceptance of any installment plan, use of the accepted installment plan for the financial account is authorized. Thereafter, bills are generated which reflect installment charges to be paid. Thus, the purchaser may afford more purchases than otherwise possible, and may utilize such installment payments for purchases bought at many sellers.

BRIEF DESCRIPTION OF THE DRAWINGS

FIG. 5A is a schematic illustration of a purchaser database of the central controller of FIG. 4.

FIG. 5B is a schematic illustration of a transaction database of the central controller of FIG. 4.

FIG. 5C is a schematic illustration of an installment plan database of the central controller of FIG. 4.

FIG. 5D is a schematic illustration of a record of a purchaser billing database of the central controller of FIG. 4.

FIG. 5E is a schematic illustration of an installment payments database of the central controller of FIG. 4.

FIG. 5F is a schematic illustration of a merchant database of the central controller of FIG. 4.

FIG. 12 is an exemplary bill generated in accordance with the present invention.

DETAILED DESCRIPTION OF THE PREFERRED EMBODIMENTS

The present invention provides a purchaser at a point-of-sale terminal with options for paying for a purchase. The purchaser selects between (i) charging the entire purchase price at the time of sale, as is common; and (ii) charging a number of installments at periodic intervals. Thus, the present invention allows credit card users to choose installment plans at the time of sale, thereby allowing purchasers to pay for many more purchases without exceeding the corresponding balance limit. Even after making high-priced purchases, a balance limit is not reached as easily, and thus much more credit remains available. Purchasers may even be able to pay for high-priced purchases that would have otherwise been unaffordable.

The credit card issuer or credit card clearinghouse typically provides and manages such installment plans, so sellers need not incur any charges associated with establishing and administering installment plans. Yet, purchasers may take advantage of installment plans at any seller that allows credit card purchases, and are not limited to selected items. Thus, the seller receives additional cash flow from selling additional items, and replacement inventory may be quickly acquired.

When establishing a credit card account for a purchaser, the issuer typically performs a credit check to determine a score indicating the purchaser's "credit worthiness." The balance limit is then set according to the credit worthiness, and may be adjusted thereafter. The credit card issuer thus already has credit information for the purchaser, and has presumably employed that information in (i) granting the credit card account to the purchaser, (ii) setting the account balance limit, and/or (iii) setting an interest rate of the account. Thus, in the present invention no additional costs need be incurred in reevaluating the credit worthiness of the purchaser.

Further, the present invention does not require any additional effort by the seller, who typically has no information on the credit-worthiness of the purchaser. The seller receives the full purchase price at the time of purchase regardless of whether the purchaser chooses to pay his credit card account balance in installments, so the seller is not disadvantaged. In addition, since the seller need not perform any additional steps in offering installment plans, purchasers may take advantage of the present invention when paying for items from any seller that permits credit card transactions.

Of further benefit is that after being exposed to the installment options, the purchaser learns to associate corresponding monthly payment amounts with a purchase price. Thus, the purchaser can eventually become able to determine whether an item is likely to be affordable, even before the POS terminal provides installment plan options for a specific purchase.

Figure 1:
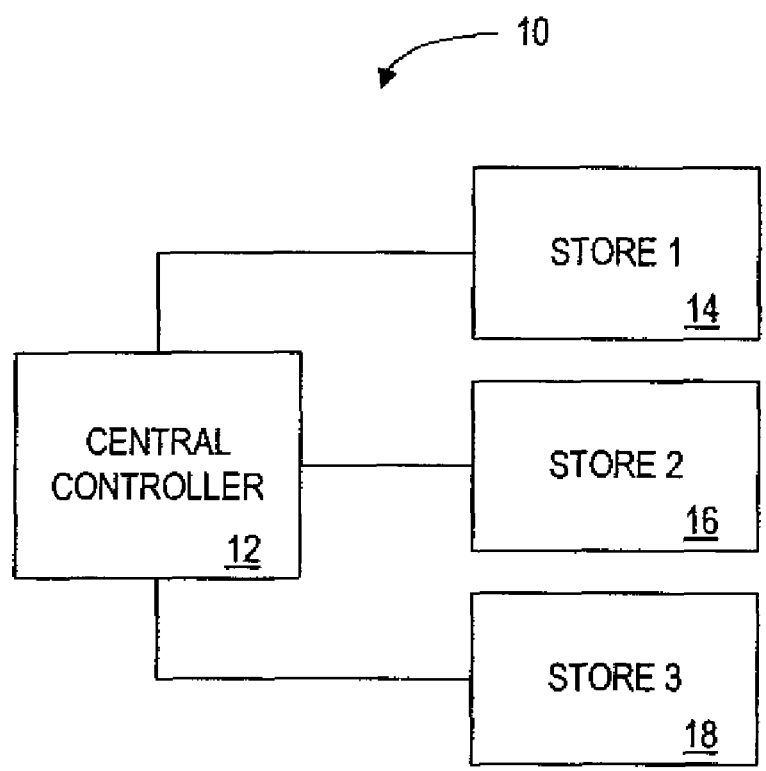
FIG. 1 is a schematic illustration of an apparatus for providing installment plan options provided in accordance with the present invention.

Referring to FIG. 1, an apparatus 10 comprises a central controller 12 connected to each of stores 14, 16 and 18. As described in detail below, the stores 14, 16 and 18 are sellers that accept credit card transactions by purchasers, and the central controller 12 provides the stores 14, 16 and 18 with installment plan options for the purchasers at the time of sale. Although three stores are shown in FIG. 1, it will be understood by those skilled in the art that the invention is applicable to one or more stores. The central controller 12 may be, for example, a controller of (i) a credit card issuer, such as Citibank Corporation; (ii) a credit card clearinghouse, such as First Data Corporation, or (iii) a store-specific (closed network) controller, such as a controller that administers transactions on J.C. Penney credit cards.

Figure 2:
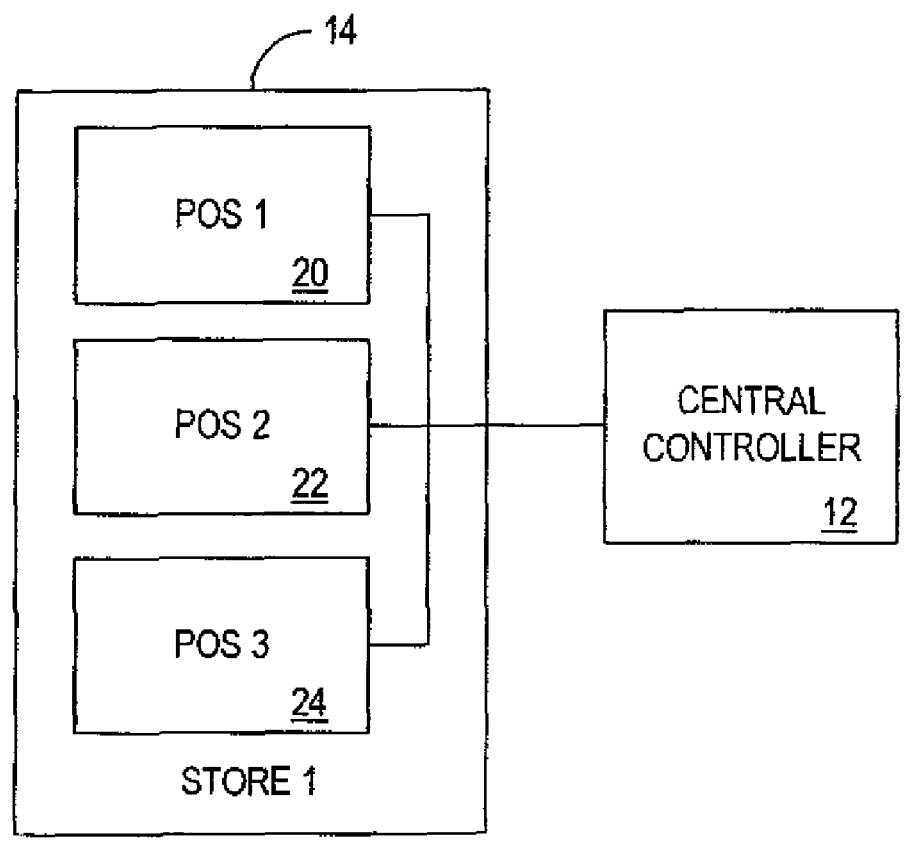
FIG. 2 is a schematic illustration of a store of the apparatus of FIG. 1.

Referring to FIG. 2, the store 14 of FIG. 1 is illustrated in more detail. Stores 16 and 18 (FIG. 1) are similar to the store 14, and so a detailed illustration of each is omitted. The store 14 comprises POS terminals 20, 22 and 24, each connected to the central controller 12. The POS terminals 20, 22 and 24 are typically cash registers or other devices at which credit cards or ATM cards are used in paying or receiving money. Accordingly, the POS terminals 20, 22 and 24 accept input from credit cards or other financial accounts, and communicate with the central controller 12 to effect the use of financial accounts in paying for purchases. One or more POS terminals may be included in the store 14 and connected to the central controller 12.

Figure 3:
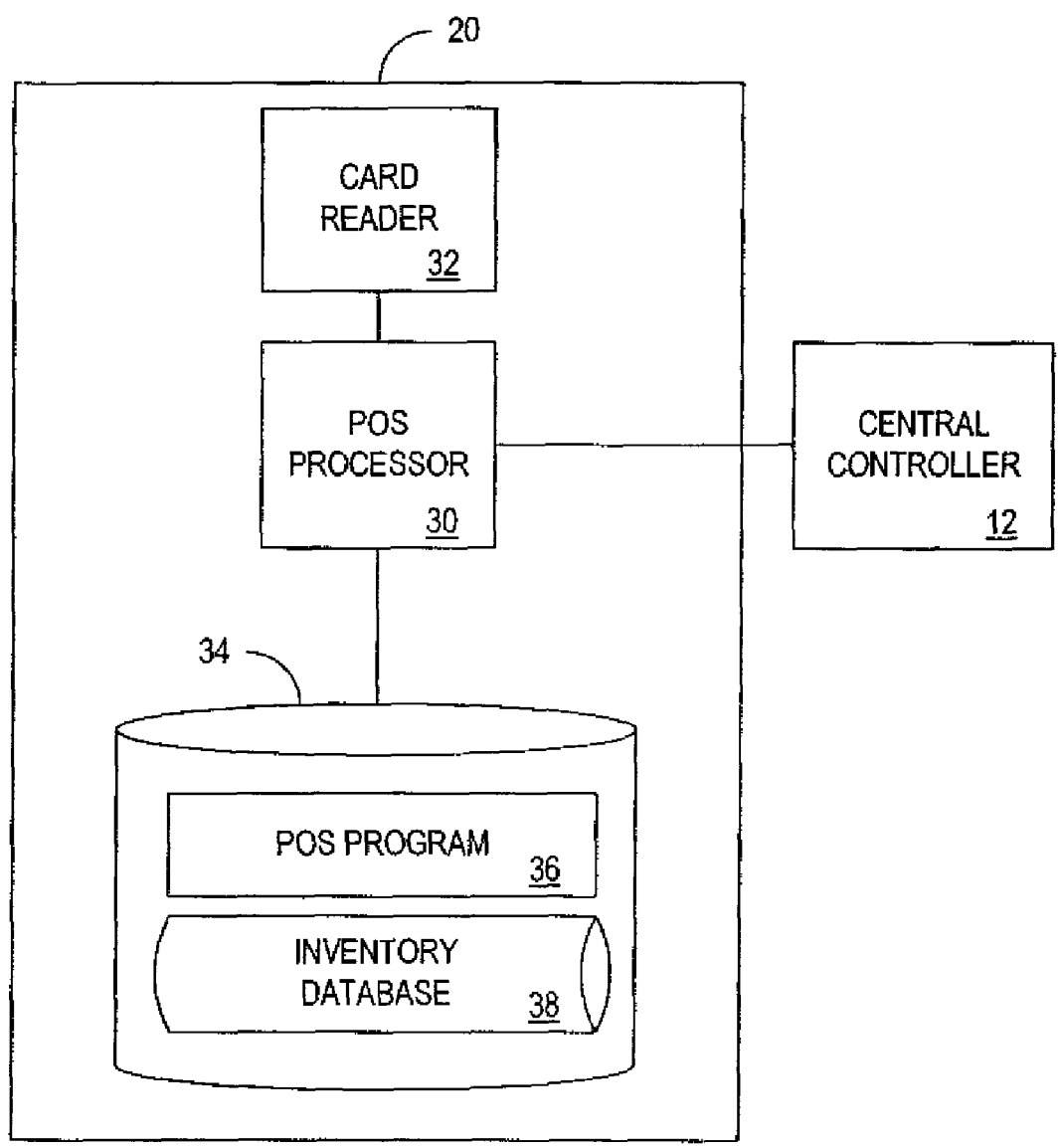
FIG. 3 is a schematic illustration of a POS terminal of the store of FIG. 2.

FIG. 3 illustrates the POS terminal 20 of FIG. 2 in more detail. POS terminals 22 and 24 (FIG. 2) are similar to the POS terminal 20, and so a detailed illustration of each is omitted. The POS terminal 20 comprises a POS processor 30, such as one or more conventional microprocessors, which is connected to each of a card reader 32 for reading input from credit cards and a data storage device 34, such as a RAM, floppy disk, hard disk or combination thereof. The POS processor 30 is also connected to the central controller 12 of FIG. 1.

The POS processor 30 and the storage device 34 may each be (i) located entirely within a single computer or other computing device; (ii) connected to each other by a remote communication link, such as a serial port cable, telephone line or radio frequency transceiver, or (iii) a combination thereof. For example, the POS terminal 20 may comprise one or more computers connected to a remote server computer for maintaining databases. The card reader 32 may be any of several known devices that allow a credit card to be passed ("swiped") therethrough, thereby permitting information stored on the credit card to be read. One such card reader is an OMNI 490, sold by VeriFone Inc.

The storage device 34 stores (i) a program 36 for controlling the POS processor 30, and (ii) an inventory database 38 for storing item prices. The program 36 drives the POS processor 30 to operate in a manner known in the art, and particularly to calculate item prices and aggregate those prices to determine purchases prices. The program 36 also includes program elements that may be necessary, such as "device drivers" for interfacing with the card reader 32 and/or computer peripheral devices. Appropriate device drivers and other necessary program elements are known to those skilled in the art, and need not be described in detail herein.

The inventory database 38 permits item prices to be determined, and thereby permits a purchase price of several items to be determined. In embodiments where there is more than one POS terminal for a store, the inventory database of each POS terminal may be stored on a single database server in communication with the POS processor of each POS terminal. Thus, each POS processor may access common item price data.

Figure 4:
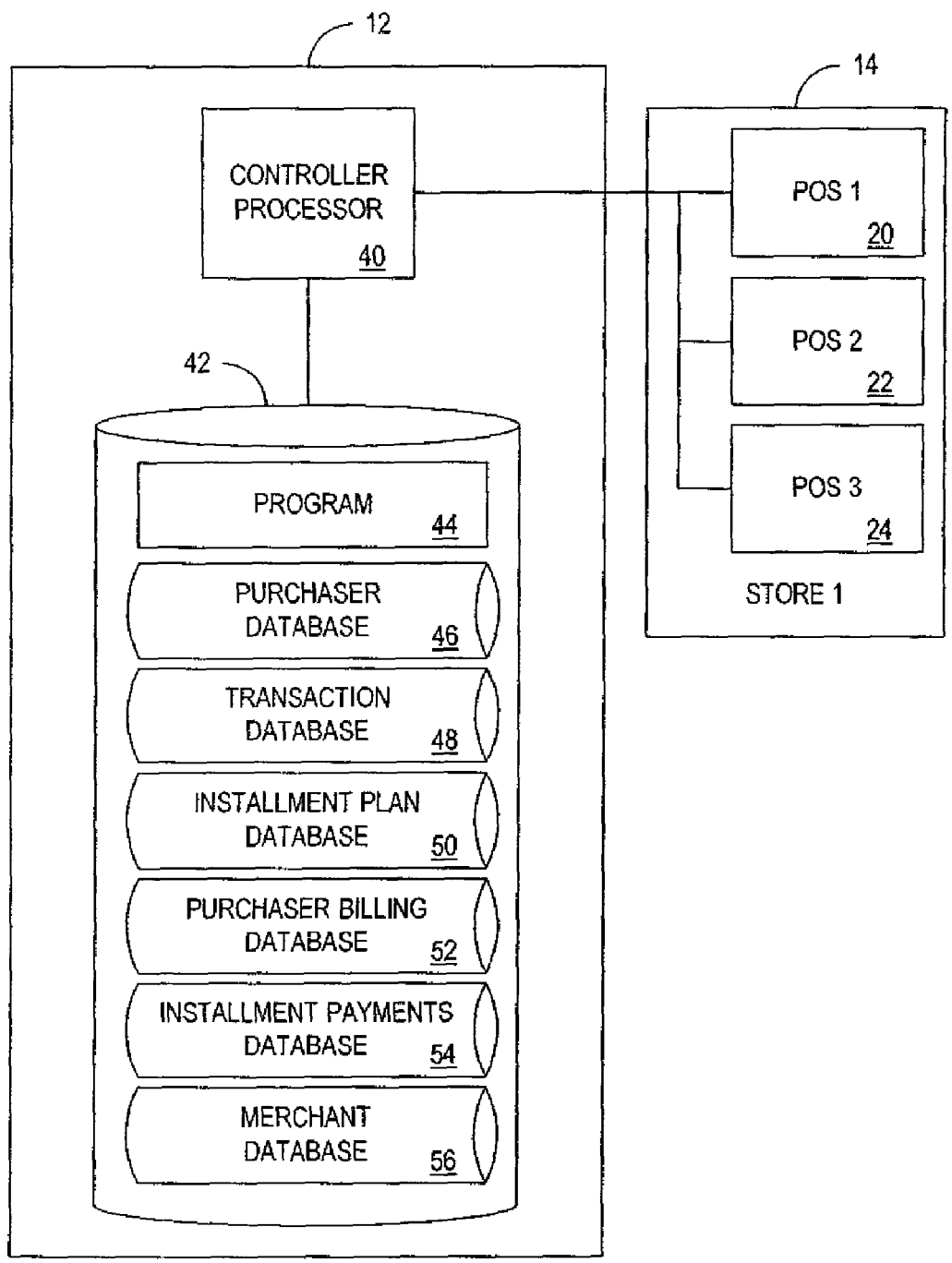
FIG. 4 is a schematic illustration of a central controller of FIG. 1.

FIG. 4 illustrates the central controller 12 of FIG. 1 in more detail. The central controller 12 comprises a controller processor 40, such as one or more conventional microprocessors, which is connected to a data storage device 42, such as a RAM, floppy disk, hard disk or combination thereof. The controller processor 40, and thus the central controller 12, is further connected to the POS processors 20, 22 and 24 of FIG. 2. The controller processor 40 and the storage device 42 may each be (i) located entirely within a single computer, (ii) connected to each other by a remote communication link, such as a serial port cable, telephone line or radio frequency transceiver; or (iii) a combination thereof. For example, the central controller 12 may comprise one or more computers connected to a remote server computer for maintaining databases.

The storage device 42 stores (i) a program 44 for controlling the controller processor 40 in accordance with the present invention, and particularly in accordance with the processes described in detail below; (ii) a purchaser database 46 for storing purchaser records; (iii) a transaction database 48 for storing past credit card purchases; (iv) an installment plan database 50 for storing installment plan options; (v) a purchaser billing database 52 for storing billable charges; (vi) an installment payments database 54 for storing total installment payments made; and (vii) a merchant database 56 for storing merchant records.

The program 44 includes program elements that may be necessary, such as "device drivers" for interfacing with computer peripheral devices. Appropriate device drivers and other necessary program elements are known to those skilled in the art, and need not be described in detail herein. Each of the databases 46, 48, 50, 52, 54 and 56 are described in detail below and depicted with exemplary entries in the accompanying drawings. The schematic illustrations and accompanying descriptions of the databases presented herein are exemplary arrangements for the stored information. As will be understood by those skilled in the art, a number of other arrangements may be employed besides the tables shown in the drawings.

Referring to FIG. 5A, the purchaser database 46 stores entries 57, 58 and 59, each having a credit card account number 60 which uniquely indicates an account. Each of the entries 50, 52 and 54 further has a name 61, an address 62, an account balance limit 63 and an account balance 64. Each entry of the purchaser database 46 thus defines a credit card account and associated purchaser.

Referring to FIG. 5B, the transaction database 48 stores entries 70, 72 and 74, each having a transaction identifier 76 which uniquely indicates a credit card account transaction. Each of the entries 70, 72 and 74 further has a credit card account number 78 identifying an account on which the transaction occurred, a date of the transaction 80, an installment plan identifier 82 for indicating an installment plan, if any, applied to the transaction, a merchant identifier 84 specifying a merchant at which the transaction occurred, and a purchase price 86 of the transaction.

Referring to FIG. 5C, the installment plan database 50 stores entries 90, 92 and 94, each having an installment plan identifier 96 which uniquely indicates a different installment plan. Each of the entries 90, 92 and 94 further has a term 98 indicating the number of payments to be made under the installment plan, an interest rate 100 of the installment plan, and a required purchase price 102 at which the installment plan may be utilized.

Referring to FIG. 5D, a record 108 of the purchaser billing database 52 (FIG. 4) illustrates billable transactions for an account defined by a credit card account number 109. A billable transaction is a charge that will typically appear on a purchaser's bill. For example, if a transaction having a purchase price of $1,000 is to be paid for in installments, the total purchase price of $1,000 does not appear as a charge on the bill. Instead, each of the installments appears as a charge on subsequent bills. Each such installment is generated based on the initial transaction purchase price, and stored in the purchaser billing database 52 (FIG. 4). In addition, since each of the installments are generated based on the initial transaction, it may be desirable that each installment have a transaction identifier related to that of the initial transaction. For example, if the initial transaction has a transaction identifier "555", the corresponding installments may have transaction identifiers "555-1", "555-2", and so on.

Typically, the purchaser billing database 52 (FIG. 4) includes a plurality of records such as the record 108. Each such record indicates the billable transactions for a different credit card account. The record 108 includes entries 110, 112 and 114. Each of the entries 110, 112 and 114 defines a billable transaction for the account, and is uniquely identified by a transaction identifier 116 corresponding to a transaction identifier 76 of the transaction database 48 (FIG. 5B). Accordingly, based on the transaction identifier 116, information corresponding to the transaction may be determined from the transaction database 48 (FIG. 5B). Alternatively, each of the entries 110, 112 and 114 may include corresponding information from the transaction database 48, such as the transaction date 118, the billable charge 120 and merchant identifier 122. Further, a transaction description 124 that describes the transaction may be stored. It will be understood that the billable charge 120 represents an installment amount when the corresponding transaction is an installment payment.

Referring to FIG. 5E, the installment payments database 54 stores entries 130, 132 and 134, each corresponding to a transaction that has had an installment plan applied thereto. Each of the entries 130, 132 and 134 has a credit card account number 136 indicating the account on which the transaction was made, a purchase price 138 of the transaction, a transaction identifier 140 uniquely identifying the transaction, and an installment plan identifier 142 indicating the applicable installment plan. Each of the entries 130, 132 and 134 further has a number of payments made 144 indicating the number of installments received for the transaction, and an installment amount 146 indicating the amount of each installment.

Referring to FIG. 5F, the merchant database 56 stores entries 150, 152 and 154, each indicating a seller which may communicate with the central controller 12 (FIG. 1). Each of the entries 150, 152 and 154 has a merchant identifier 156 uniquely indicating each seller, a merchant name 158 and a merchant address 160. If the central controller is a controller which communicates with only one seller, the merchant database may not need to be used.

Figure 6:
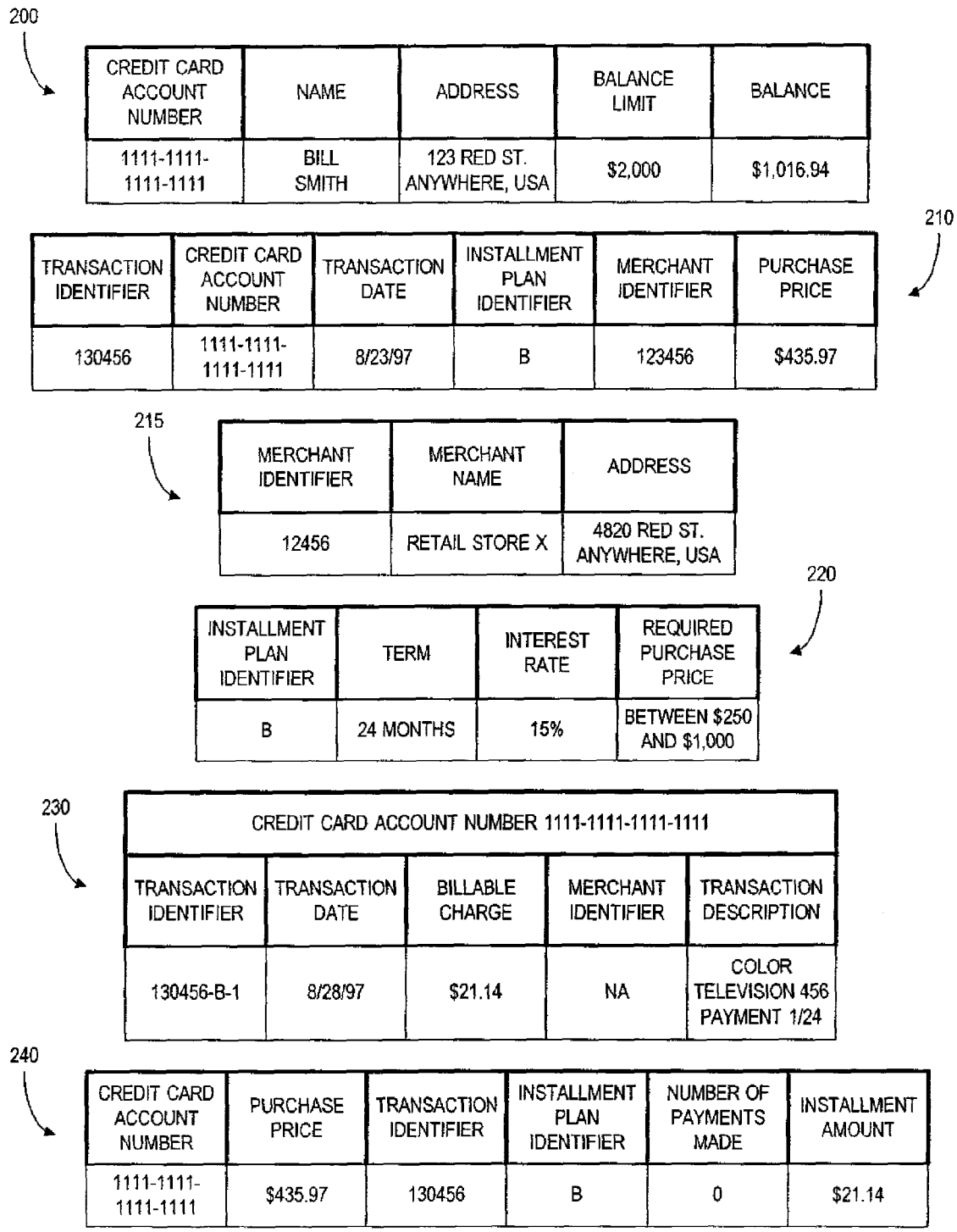
FIG. 6 is a schematic illustration of exemplary records of the databases of FIGS. 5A through 5F.

FIG. 6 illustrates exemplary records used in establishing and utilizing an installment plan for a purchase. A purchaser database 200, which is an embodiment of the purchaser database 46 of FIG. 5A, stores an account "1111-1111-1111-1111". A transaction database 210, which is an embodiment of the transaction database 48 of FIG. 5B, stores a transaction "130456" on the account "1111-1111-1111-1111". As also illustrated by the transaction database 210, the transaction "130456" is for a purchase price of $435.97 from a seller (merchant) "12456", and is to be paid for using installment plan "B". A merchant database 215, which is an embodiment of the merchant database 56 of FIG. 5F, stores a name and address of the seller "12456".

An installment plan database 220, which is an embodiment of the installment plan database 50 of FIG. 5C, stores a description of the installment plan "B". As illustrated in FIG. 6, purchase prices of between $250 and $1,000 may be paid for using installment plan "B". Such purchase prices are repaid in 24 monthly installments at an interest rate of 15%.

A purchaser billing database 230, which is an embodiment of the purchaser billing database 52 of FIG. 4, stores a billable transaction for the account "1111-1111-1111-1111". As illustrated, the billable transaction represents an installment payment of $21.14 that is due in connection with the transaction "130456" illustrated in the transaction database 210. The billable transaction is identified by "130456B-1", indicating that it represents the first payment under installment plan "B" of the transaction "130456".

An installment payments database 240, which is an embodiment of the installment payments database 54 of FIG. 5E, stores the number of payments made (zero payments) towards the transaction "130456". Based on the number of payments made, it may be determined whether, or how many, installments remain to be paid. Therefore, based on the installment payments database 240, it may be determined whether additional billable transactions will appear on subsequent bills.

Figure 7:
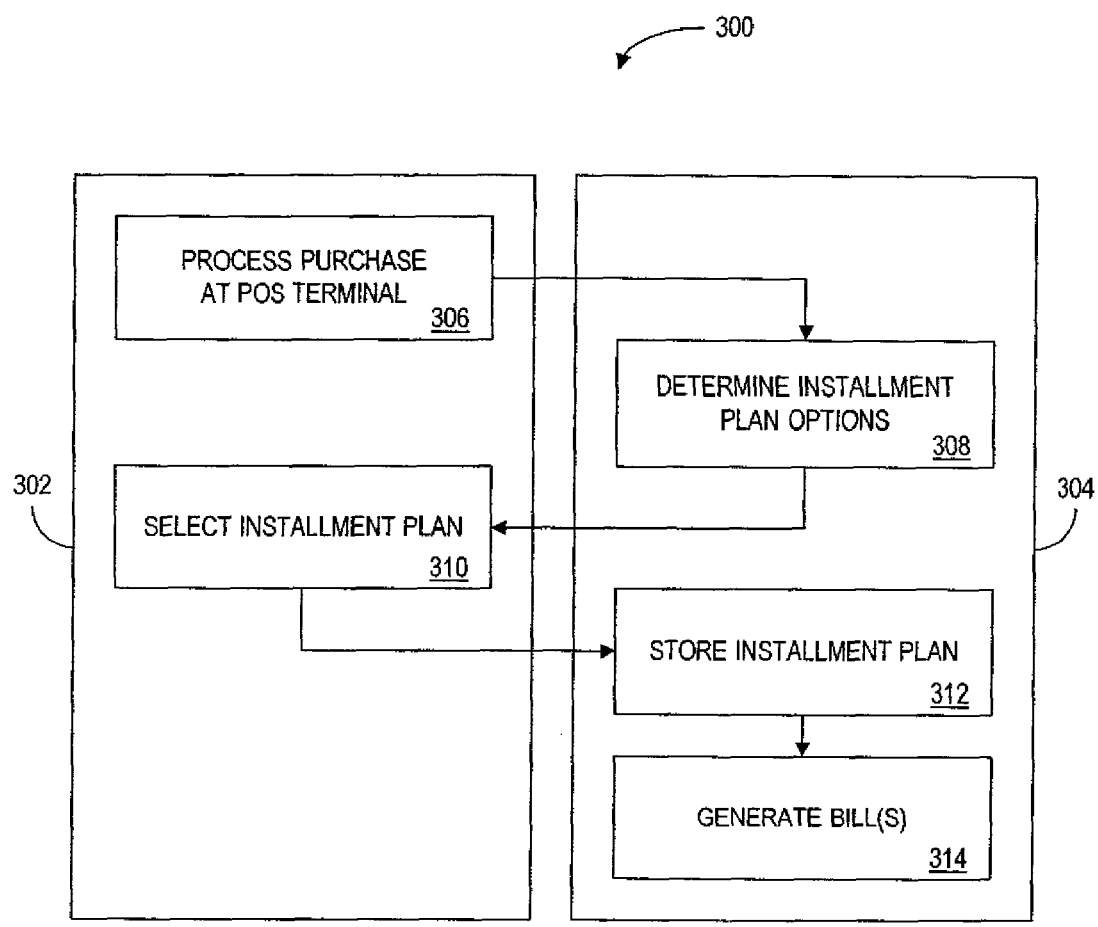
FIG. 7 is a flowchart illustrating a process for allowing a purchaser to select an installment plan.

Referring to FIG. 7, a method 300 illustrates in simplified form an embodiment of a process for allowing a purchaser to select an installment plan for purchases at a time of sale. The method includes steps 302 that are performed by a POS terminal, as well as steps 304 that are performed by the central controller. A purchase is processed at a POS terminal (step 306) in a known manner. For example, one or more items are recorded at the POS terminal, and a resulting purchase price is generated by retrieving and totaling the prices of each item. Alternatively, an amount of money may be withdrawn at a POS terminal, such as an automated teller machine (ATM), and thus the generated purchase price is the withdrawn amount plus ATM fees, if any. A credit card account number is also generated, for example, by swiping a credit card through a card reader.

The purchase price and account number are transmitted to the central controller, which determines installment plan options (step 308) and generates corresponding installment plan identifiers. Each installment plan identifier indicates an installment plan for payment of the purchase price. For example, an installment plan identifier may be an interest rate and number of payment periods, or may be a pointer to an entry in a database where such information is stored.

The installment plan identifiers are transmitted to the POS terminal, providing the purchaser with the installment plan options to select. The purchaser selects one installment plan (step 310), if desired, and this selection is transmitted to the central controller. The selected installment plan, if any, is stored (step 312) and subsequently used in generating bills for the purchaser (step 314).

Figure 8:
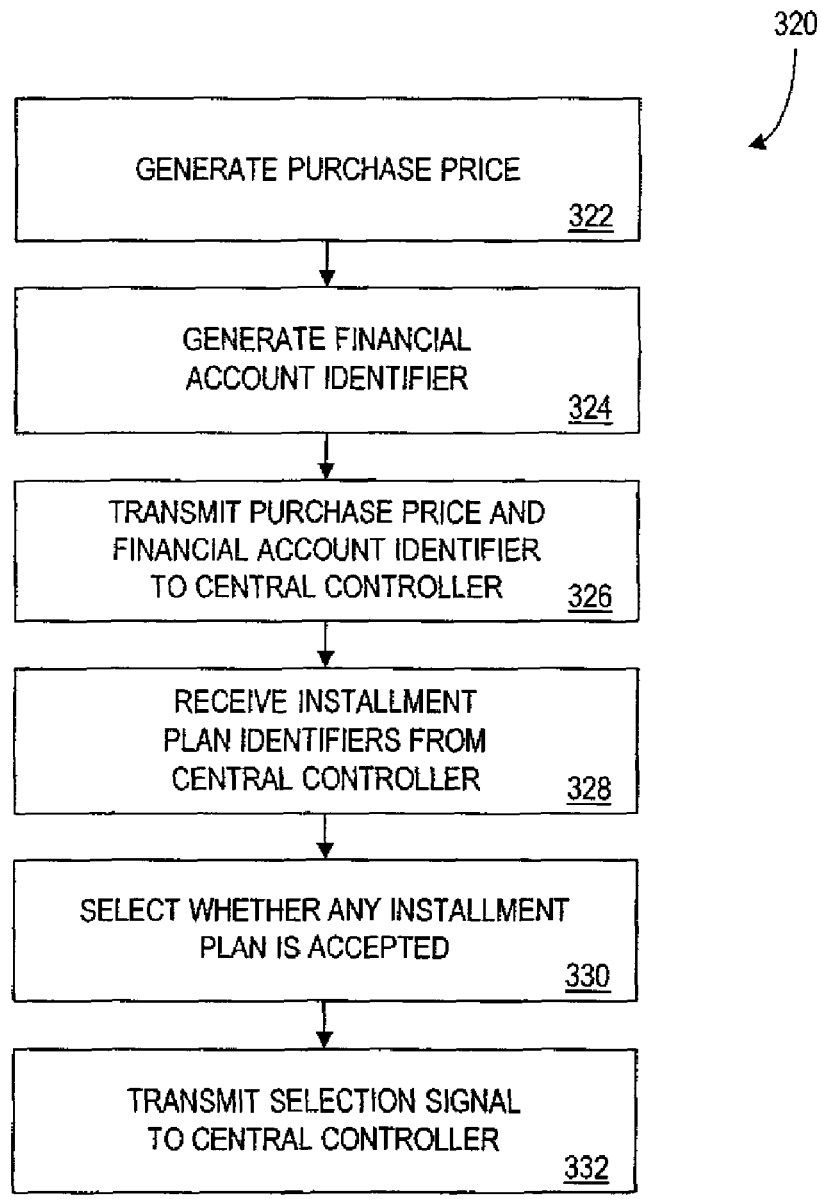
FIG. 8 is a flowchart illustrating steps of the process of FIG. 7 that are performed by a POS terminal.

FIG. 8 illustrates a process 320 that describes in greater detail the steps of FIG. 7 which are performed by the POS terminal. As described above, the POS terminal generates a purchase price (step 322) and a financial account identifier (step 324), such as a credit card number, for specifying a financial account. The purchase price and the financial account identifier are transmitted to the central controller (step 326). The POS terminal may also transmit a merchant identifier specifying the seller controlling the POS terminal and/or product codes indicating each item.

In response, the POS terminal receives one or more installment plan identifiers, each specifying an installment plan for payment of the purchase price (step 328) and displays signals indicative of each installment plan. For example, the POS terminal may display monthly payment amounts and a number of months for each installment plan. The POS terminal generates a selection signal indicative of whether to accept one of the installment plans (step 330). The selection signal thus indicates (i) a selected one of the installment plans, or (ii) that no installment plan was selected (e.g., if the purchaser does not wish to pay in installments). The selection signal may be generated by a single choice (e.g., selecting from "plan A", "plan B" and "no plan"). Alternatively, the selection signal may include (i) a first selection indicating whether an installment plan is desired, and (ii) a second selection indicating a selected installment plan if the first selection indicates the installment plan is desired. In such an embodiment, the central controller may transmit the installment plans identifiers to the POS terminal either before or after the first selection. The selection signal is then transmitted to the central controller (step 332).

Figure 9:
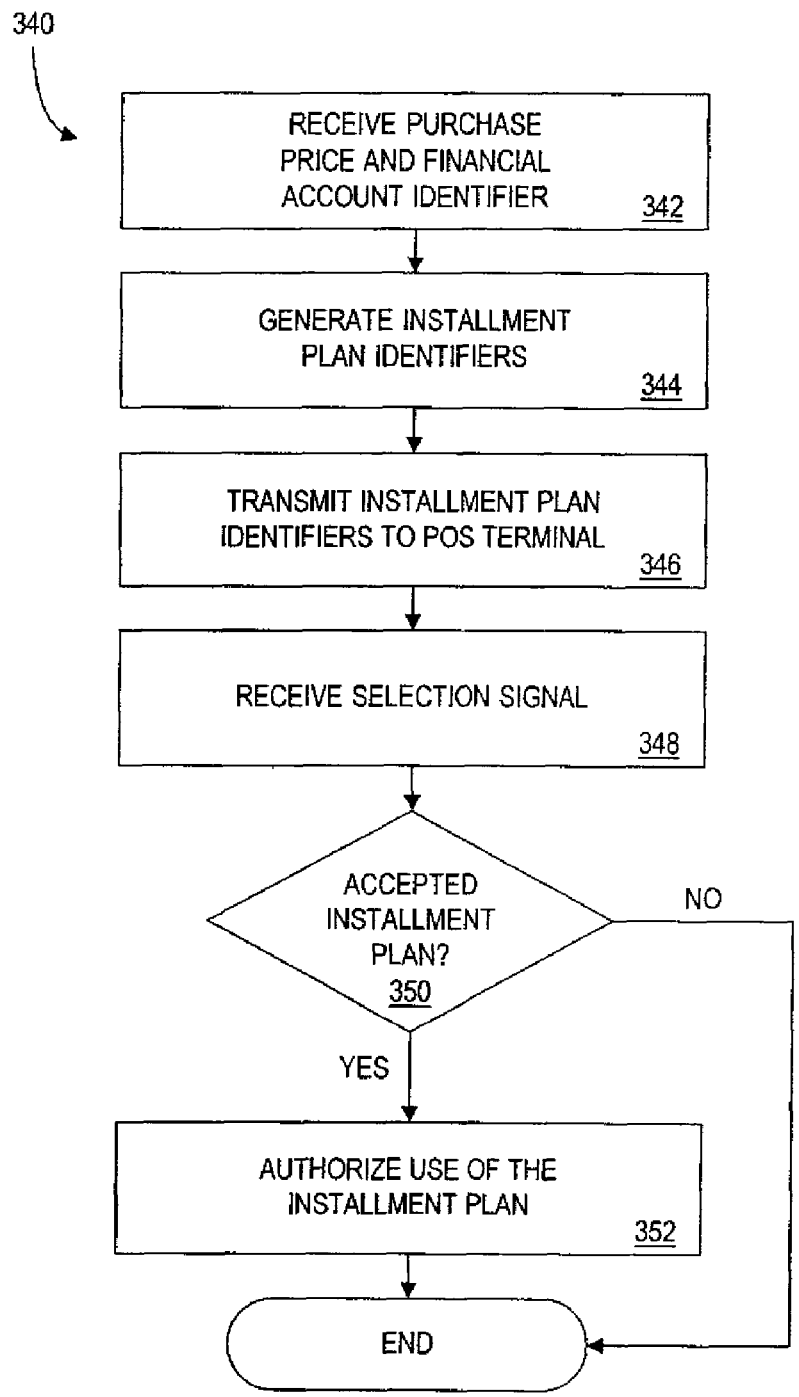
FIG. 9 is a flowchart illustrating steps of the process of FIG. 7 that are performed by a central controller.

FIG. 9 illustrates a process 340 that describes in greater detail the steps of FIG. 7 which are performed by the central controller. As described above, the central controller receives the purchase price and the financial account identifier from the POS terminal (step 342). The central controller then generates at least one installment plan identifier defining an installment plan for payment of the purchase price (step 344). As described in greater detail below, the installment plan, and thus the installment plan identifier, is based on at least one of the purchase price and the financial account identifier. The installment plan identifier is then transmitted to the POS terminal (step 346).

The central controller then receives a selection signal indicative of whether to accept the installment plan (step 348). If the selection signal indicates acceptance of one installment plan (step 350), use of the accepted installment plan for the financial account is authorized (step 352). When use of the accepted installment plan is authorized, the purchase price is to be repaid in installments, rather than charged on a single bill. Calculation of installments and charging those installments on bills are described in detail below.

Figure 10:
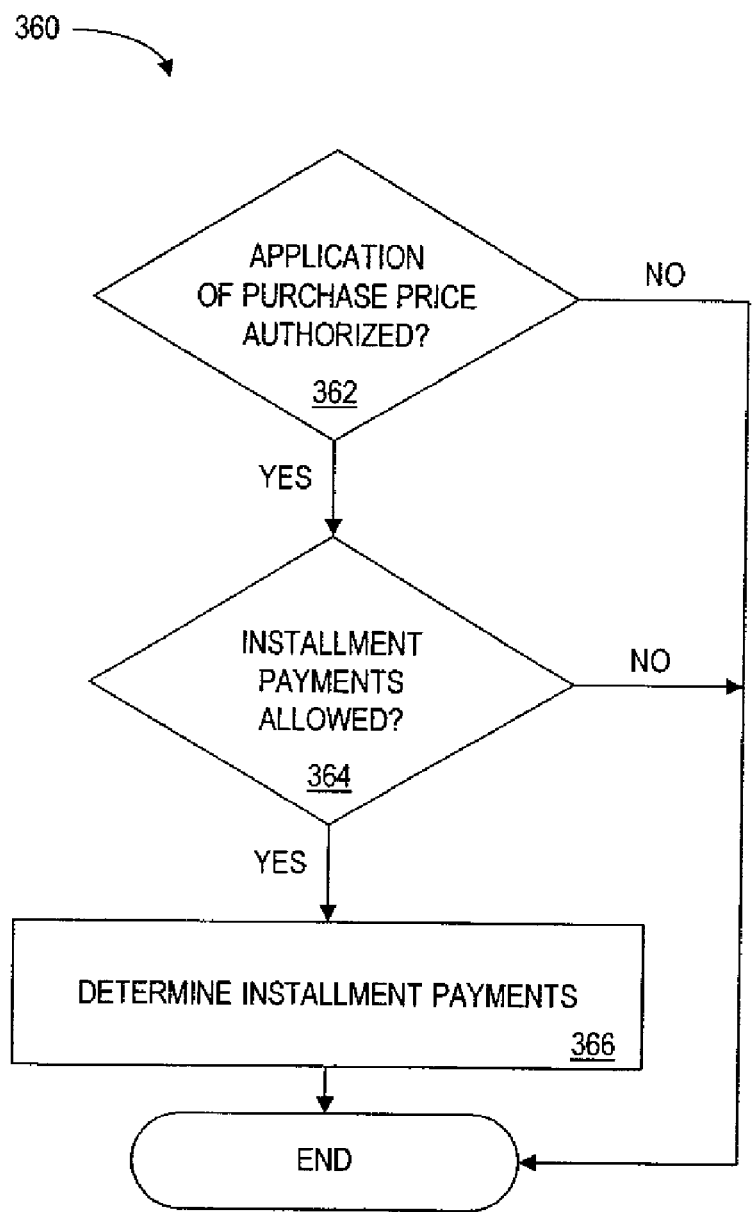
FIG. 10 is a flowchart illustrating a process for determining one or more installment plans to offer a purchaser.

Referring to FIG. 10, a process 360 is performed by the central controller in determining one or more installment plans to offer a purchaser at a POS terminal. In general, the central controller determines whether application of the purchase price to the financial account is authorized (step 362). The step 362 is also known as "authorizing the charge", and typically comprises an evaluation of whether the credit card account meets approval criteria of the credit card account issuer. Approval criteria are specific to each issuer, and may include the following: (i) the account must be in good standing, and not past due; (ii) applying the purchase price to the current balance of the account would exceed the balance limit (some issuers may approve purchases that exceed the balance limit by a specified margin), (iii) the corresponding credit card must not have been reported stolen or lost; and (iv) the account should not be closed.

If the charge is authorized, the central controller determines whether to allow installment payments on the purchase price (step 364). Typically, the central controller makes the determination based on the purchase price and/or the financial account identifier. For example, the central controller may compare the purchase price to a predetermined amount, and allow installment payments only if the purchase price exceeds the predetermined amount. The central controller may also determine whether the specified account has been "pre-approved" such that installment payments are always allowed, e.g. as determined by a purchaser score. An indication of such pre-approval may be stored, for example, in the purchase database 46 (FIG. 4). In still another embodiment, each installment plan may have one or more conditions, and installment payments are allowed if any installment plants conditions are met. For example, one installment plan may have a condition that the purchase price is between $250 and $1,000, while a second installment plan has a condition that the total amount charged in the last month is over $2,000. Such conditions may be stored in the installment plan database 50 (FIG. 4).

If installment payments are allowed, one or more installment plans are determined and offered to the purchaser (step 366), as described above. There are several different methods for determining installment plans to offer. For example, there may be a predetermined set of installment plans that is offered to every purchaser. In another embodiment, the set of offered installment plans may depend on the seller. Alternatively, there may be a set of installment plan identifiers stored for one or more purchaser entries in the purchaser database 46 (FIG. 4). In such an embodiment, the installment plan options would be "personalized" to each purchaser and the corresponding installment plans are in turn offered to that purchaser Installment plan identifiers for each purchaser may be determined based on a score that is predictive of purchaser behavior. The score is determined in accordance with a scoring system. A scoring system is a mathematical model designed to provide probabilities of future performance based on the actual historic performance of a creditor. Models are developed from past behavior and data relationships, and the models are used to identify predictive variables. Scoring systems can be used as absolute decision tools or in combination with judgmental and expert system rules.

Credit card issuers currently use scores to determine: (i) who will respond to an offer; (ii) who will reliably repay credit; and (iii) who will generate revenue for an issuer. The above-described scores are known as (i) response scores, (ii) risk scores and (iii) revenue scores, respectively. Response scores are used to determine how to modify solicitations for maximum results and for areas of the country that have the greatest growth potential for specifically designed card products, such as insurance or investment cross-sells. Risk scores are used to predict delinquencies and bankruptcies, as well as the extent and timing of monthly payments. Revenue scores are used in assigning a ranking to individuals by the relative amount of revenue they are likely to produce over a period of time following score assignment. Revenue scores help issuers to manage accounts by identifying inactive accounts that should be targeted with an appropriate offer, and by identifying the most desirable prospects for acquisition.

A score may be classified as either a "credit score" or a "behavior score." A credit score is a statistical measure used by issuers to determine whether to extend credit in the form of a loan or as a credit line on a credit card account. Credit scores take into account many factors, including: annual income, years at current job, residence, debt payment history, current debt obligations and long term debt obligations. Issuers may assign different weights to these criteria to compute a credit score.

A behavior score is another statistical measure used by issuers to better manage accounts, thereby attempting to maximize profit earned per account. The behavior score can include more than 50 different characteristics, including: extent of monthly payments, promptness of payment, use of card for purchases or cash advances, size and type of purchases and types of spending categories among others.

Figure 11:
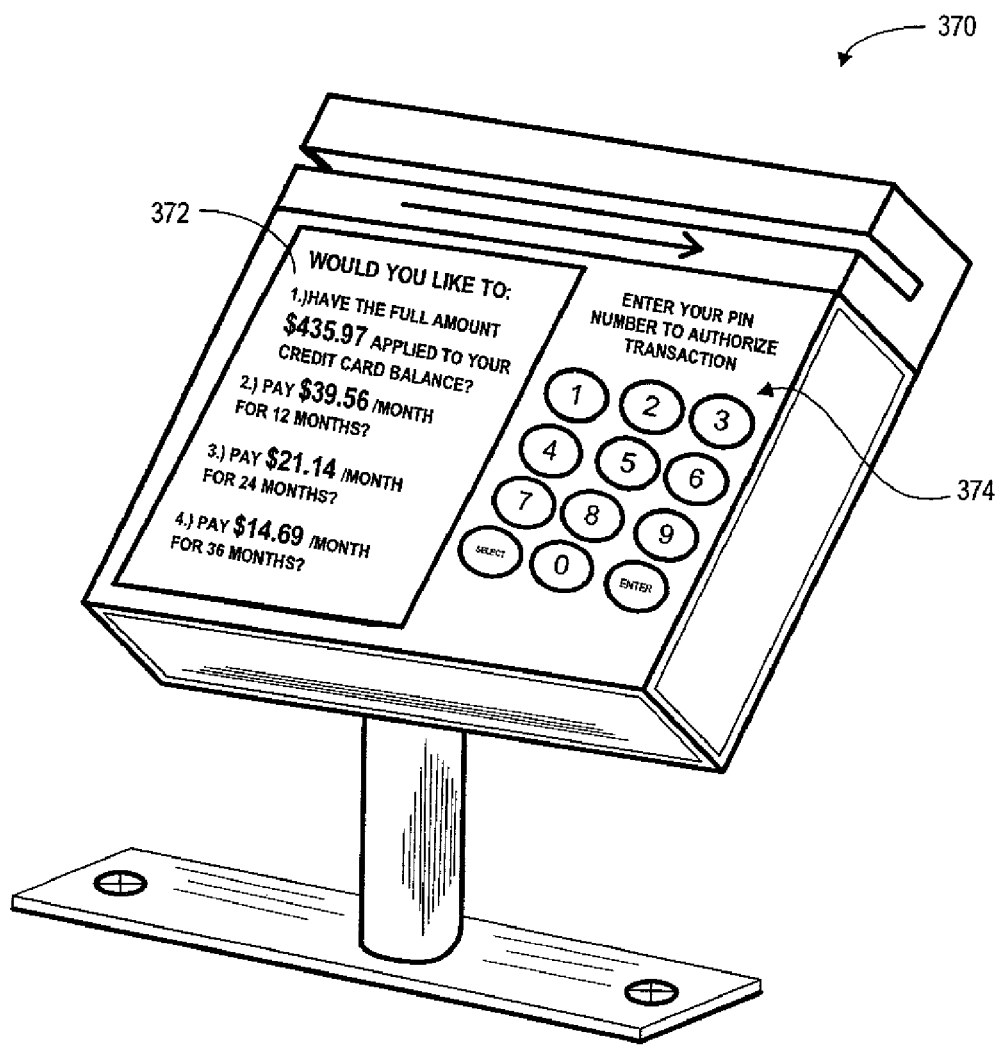
FIG. 11 is a schematic illustration of a card reader of a POS terminal.

Offering the installment plans to the purchaser typically includes displaying signals indicative of the installment plans. For example, as shown in FIG. 11, a card reader 370 of a POS terminal has a display region 372 that shows text indicating monthly payment amounts and a number of installments for each of three installment plans. To select one of the three installment plans, the purchaser would press a corresponding number on a keypad 374. To reject all installment plans, the purchaser would press another number key ("1" in FIG. 11) indicating that the purchase price will be applied to the account in one charge instead of in several installment charges.

When an installment plan is selected and transmitted to the central controller, the central controller calculates the amount of the corresponding installments based on purchase price, the interest rate and the number of installments. Financial calculations of this type are well known, and described in Chapter Three of "Principles of Corporate Finance, Fourth Edition", by Richard A. Brealey and Stewart C. Myers, incorporated herein by reference as part of the present disclosure. An installment appears as a charge on subsequent bills until all installments have been paid. The first installment may appear on the next bill (e.g., next month), or may alternatively appear after a predetermined "grace period" has elapsed. For example, it may be desirable that installment payments begin six months after a corresponding transaction.

Many accounts have a minimum payment amount that a purchaser must pay each billing cycle. In some embodiments, the minimum payment amount may be increased by the amount of each billed installment. Consequently, the credit card issuer is assured that both the original minimum payment amount and the installment are received each billing cycle.

Referring to FIG. 12, an exemplary bill 400 for account number "1111-1111-1111-1111" is illustrated. The bill 400 includes charges 402, 404 and 406, of which the charge 406 is an installment charge. The bill further includes a minimum payment amount 408, which is the sum of the amount 410 of the installment charge 406 and an "original" minimum payment amount 412 due without any installment charges.

Typically, a purchaser receives a bill and submits payment therefor. Each installment payment that the purchaser makes is recorded, allowing the central controller to determine (i) the number of installments remaining, and thus (ii) when installment payments may no longer be requested. For example, upon receiving an indication that an installment has been received, the central controller may increment the number of payments made 144 (FIG. 5E) of the installment payments database (FIGS. 4 and 5E).

In other embodiments of the present invention, there may be rewards and/or "upsells" (purchase upgrade) offered to the purchaser in exchange for selecting an installment plan. In general, it may be desirable to offer a reward or upsell to a purchaser as an incentive to select an installment plan instead of paying the purchase price at once. For example, a purchaser may be offered a discount (rebate) off the purchase price if an installment plan is selected. It will be understood that although a discount may be applied to a purchase price, and the purchaser thus pays a reduced purchase price, the merchant would typically be credited with the original (not reduced) purchase price. Alternatively, the purchaser may be offered a cash payment from a cash register, frequent flyer miles or a product related to the purchased product in exchange for selecting an installment plan. In some embodiments, the offered reward or upsell may be based on the purchase price, the purchaser, and/or an item purchased. In other embodiments, the offered reward or upsell is predetermined, regardless of other factors.

Figure 13:
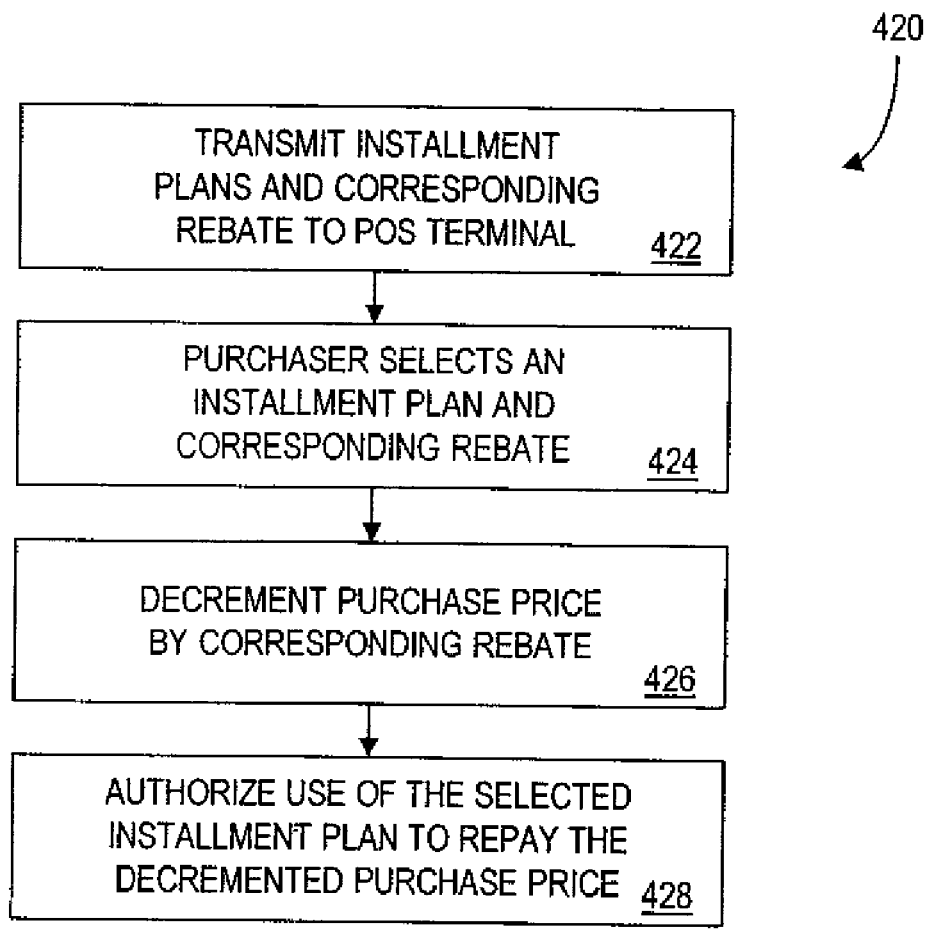
FIG. 13 is a flowchart illustrating a process for determining and offering a rebate to a purchaser.

FIG. 13 illustrates a process 420 for determining and offering a rebate to a purchaser. The central controller transmits installment plans to the POS terminal (step 422). Each installment plan has a corresponding rebate associated therewith. For example, a first installment plan may have a corresponding $5 rebate, and a second installment plan has a corresponding $20 rebate. The purchaser selects an installment plan, and thereby selects the corresponding rebate (step 424). The purchase price is decremented by the corresponding rebate (step 426), and the central controller then authorizes use of the selected installment plan to repay the decremented purchase price (step 428). Alternatively, rather than the steps 426 and 428, a "second transaction" may be generated which indicates that purchaser is due a refund, and the purchaser is given "cash back" from the POS terminal. The central controller then authorizes use of the selected installment plan to repay the purchase price.

Figure 14:
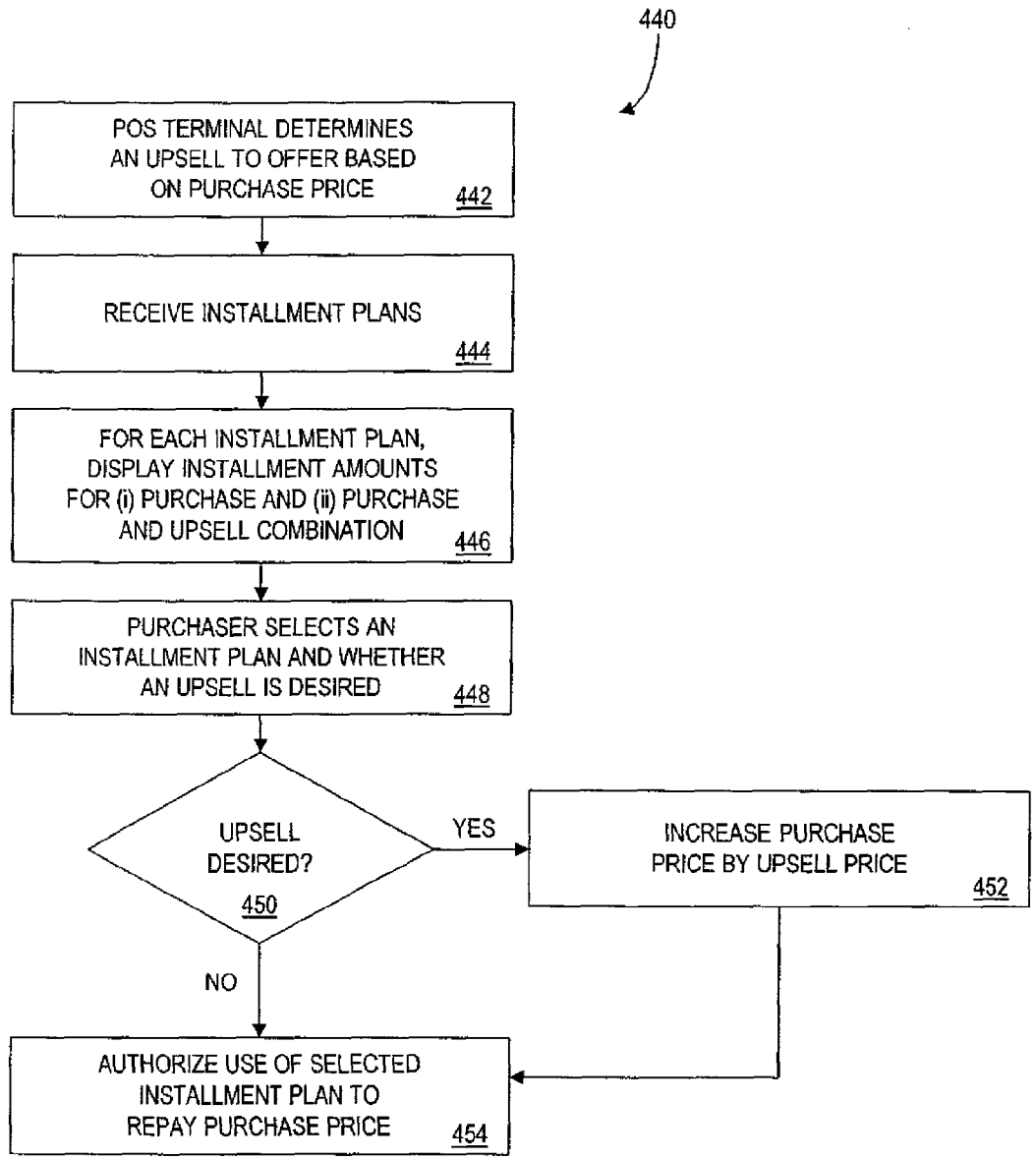
FIG. 14 is a flowchart illustrating a process for determining and offering an upsell to a purchaser.

FIG. 14 illustrates a process 440 for determining and offering an upsell to a purchaser. The POS terminal determines, based on the purchase, an upsell to offer (step 442). For example, if a purchase includes a stereo, the upsell may be a five-year warranty for the stereo. A system for determining and offering upsells is disclosed in co-pending patent application Ser. No. 08/920,116, entitled "METHOD AND SYSTEM FOR PROCESSING SUPPLEMENTARY PRODUCT SALES AT A POINT-OF-SALE TERMINAL", filed on Aug. 26, 1997.

The POS terminal receives installment plans (step 444), and displays, for each installment plan, installment amounts that are due for (i) the purchase, and (ii) the purchase and upsell combination (step 446). For example, the POS terminal may display:

With installment plan A: stereo=$10 per month; stereo and warranty=$11 per month With installment plan B: stereo=$5 per month; stereo and warranty=$6 per month A price of the upsell may be fixed or based on the selected installment plan. The upsell price may also be a price that causes the installment amount of the purchase-upsell combination to be an integral dollar amount, a multiple of five dollars, or any other desired value. The upsell price thus affects the installment amounts of the purchase-upsell combinations, and may be calculated in the same manner as described above. The purchaser selects an installment plan and whether the upsell is also desired (step 448). If the upsell is desired (step 450), then the purchase price is incremented by the upsell price (step 452). Use of the selected installment plan to repay the purchase price is authorized (step 456), as described above.

Figure 15:
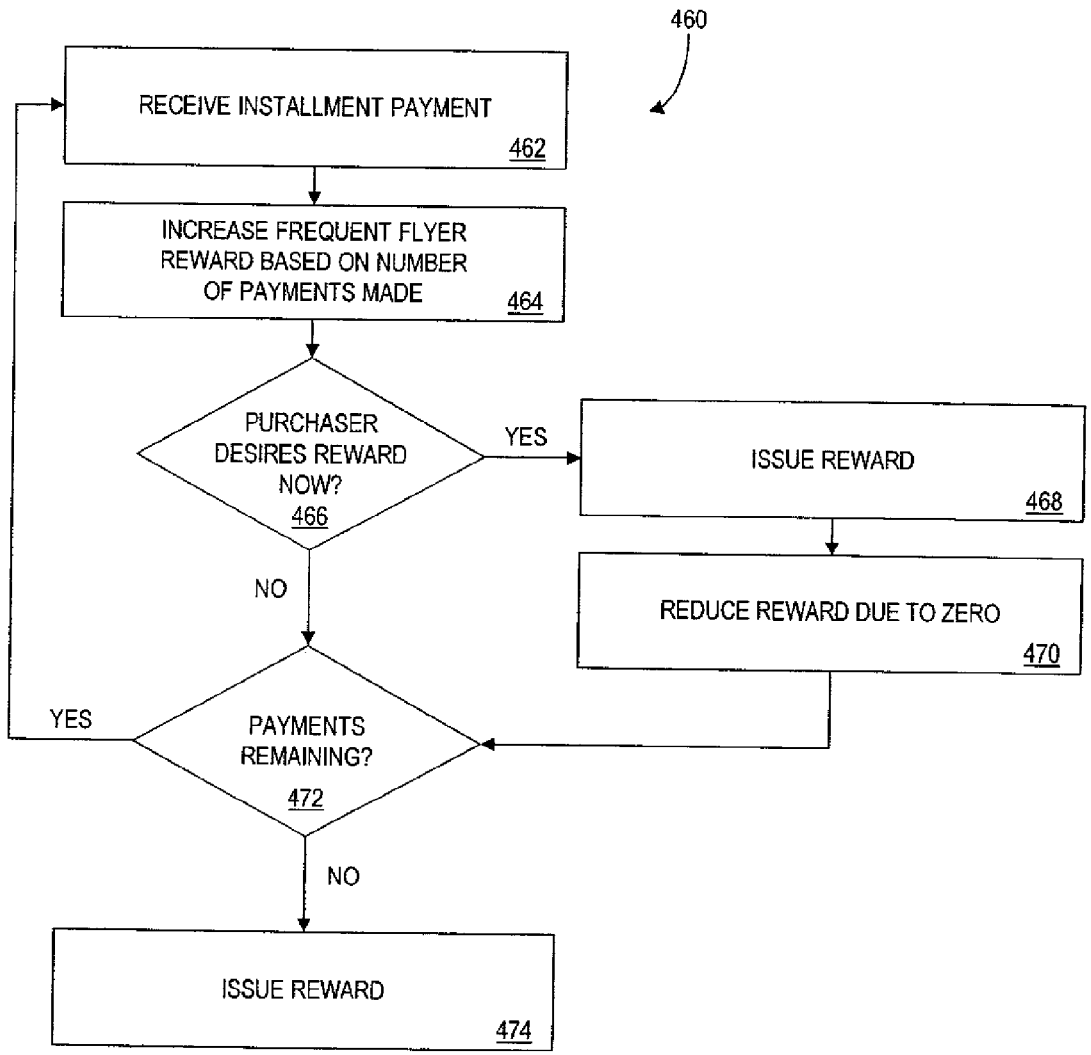
FIG. 15 is a flowchart illustrating a process for providing frequent flyer miles to a purchaser paying in installments.

Rewards and upsells may be offered to the purchaser in exchange for completing all payments for an installment plan, instead of prepaying the balance or defaulting on an installment payment. FIG. 15 illustrates a process 460 for providing frequent flyer miles to such a purchaser paying in installments. When an installment is received (step 462), a frequent flyer reward is increased, based on the number of payments made (step 464). For example, each payment made may increase the reward by 100 frequent flyer miles, or may double the number of accumulated frequent flyer miles. Alternatively, the initial payments may increase the reward by small amounts, or not at all, and only the last payment increases, or determines, the reward.

If the purchaser desires to receive any of the accumulated frequent flyer miles (step 466), the reward is issued (step 468) and in turn reduced to zero (step 470). If any installment payments remain due (step 472), the central controller waits to receive subsequent installments (step 462). If no payments remain, any reward remaining is issued to the purchaser (step 474).

Although the present invention has been described with respect to a preferred embodiment thereof, those skilled in the art will understand that various substitutions may be made to those embodiments described herein without departing from the spirit and scope of the present invention. For example, it will be understood that all of the installment payments which are due need not be equal.

What is claimed is:

1. A method, comprising: receiving, by a central controller, a purchase price of a purchase and a financial account identifier from a point of sale terminal, the financial account identifier specifying a financial account of a purchaser;
   determining, by the central controller, at least one installment plan offer for the purchase;
   transmitting the at least one installment plan offer;
   receiving, by the central controller, a selection signal indicative of acceptance of the installment plan offer;
   calculating, by the central controller, an installment charge amount to include in at least two generated bills for the financial account;
   determining a plurality of individual charges, each individual charge being for a respective purchase price of a purchase applied to the financial account in one charge and not in multiple installment charges; and
   generating a bill for the financial account, the bill including:
      the plurality of individual charges for the respective purchase prices,
      at least one installment charge amount, the at least one installment charge amount including the calculated installment charge amount,
      a first payment amount due that is a minimum payment amount due without any installment charge amounts, and
      a second payment amount due comprising a sum of the first payment amount due and the at least one installment charge amount.

2. The method of claim 1, further comprising, prior to calculating the installment charge amount, at least one of incrementing the purchase price by an amount associated with an upsell offer, or decrementing the purchase price by an amount corresponding to a reward associated with an upsell offer.

3. The method of claim 2, wherein the upsell offer comprises an offer to provide at least one of a discount, a rebate, a cash payment, an extended warranty, frequent flyer miles or a product related to an item being purchased.

4. The method of claim 1, in which calculating the installment charge amount comprises basing the installment charge amount on the purchase price, an interest rate, and a total number of installments to apply to the financial account.

5. The method of claim 1, further comprising generating a transaction indicating that a purchaser is due a refund at the point of sale terminal.

6. The method of claim 1, further comprising:
   receiving an installment payment; and
   incrementing a reward based on the installment payment.

7. The method of claim 6, further comprising:
   receiving the final installment plan payment; and
   issuing a full value of the reward to the purchaser.

8. A computer readable medium storing instructions configured to direct a processor to:
   receive, by a central controller, a purchase price of a purchase and a financial account identifier from a point of sale terminal, the financial account identifier specifying a financial account of a purchaser;
   determine, by the central controller, at least one installment plan offer for the purchase;
   transmit the at least one installment plan offer;
   receive, by the central controller, a selection signal indicative of acceptance of the installment plan offer;
   calculate, by the central controller, an installment charge amount to include in at least two generated bills for the financial account;
   determine a plurality of individual charges, each individual charge being for a respective purchase price of a purchase applied to the financial account in one charge and not in multiple installment charges; and
   generate a bill for the financial account, the bill including:
      the plurality of individual charges for the respective purchase prices,
      at least one installment charge amount, the at least one installment charge amount including the calculated installment charge amount,
      a first payment amount due that is a minimum payment amount due without any installment charge amounts, and
      a second payment amount due comprising a sum of the first payment amount due and the at least one installment charge amount.

9. The computer readable medium of claim 8, which further comprises instructions configured to direct the processor to prior to calculating the installment charge amount, at least one of increment the purchase price by an amount associated with an upsell offer, or decrement the purchase price by an amount corresponding to a reward associated with an upsell offer.

10. The computer readable medium of claim 9, wherein the upsell offer comprises an offer to provide at least one of a discount, a rebate, a cash payment, an extended warranty, frequent flyer miles or a product related to an item being purchased.

11. The computer readable medium of claim 8, in which the instructions for calculating the installment charge amount comprise instructions configured to direct the processor to base the installment charge amount on the purchase price, an interest rate, and a total number of installments to apply to the financial account.

12. The computer readable medium of claim 8, which further comprises instructions configured to direct the processor to generate a transaction indicating that a purchaser is due a refund at the point of sale terminal.

13. The computer readable medium of claim 8, which further comprises instructions configured to direct the processor to:

receive an installment payment; and increment a reward based on the installment payment.

14. The computer readable medium of claim 13, which further comprises instructions configured to direct the processor to:

receive the final installment plan payment; and issue a full value of the reward to the purchaser.

15. An apparatus, comprising:

a processor; and a storage device operatively coupled to the processor, the storage device containing instructions configured to direct the processor to:

receive a purchase price of a purchase and a financial account identifier from a point of sale terminal, the financial account identifier specifying a financial account of a purchaser;

determine at least one installment plan offer for the purchase;

transmit the at least one installment plan offer;

receive a selection signal indicative of acceptance of the installment plan offer;

calculate an installment charge amount to include in at least two generated bills for the financial account;

determine a plurality of individual charges, each individual charge being for a respective purchase price of a purchase applied to the financial account in one charge and not in multiple installment charges; and generate a bill for the financial account, the bill including:

the plurality of individual charges for the respective purchase prices, at least one installment charge amount, the at least one installment charge amount including the calculated installment charge amount, a first payment amount due that is a minimum payment amount due without any installment charge amounts, and a second payment amount due comprising a sum of the first payment amount due and the at least one installment charge amount.

16. The apparatus of claim 15, wherein the data storage device further comprises at least one database.

17. The apparatus of claim 16, wherein the at least one database comprises at least one of a purchaser database, a transaction database, an installment plan database, a purchaser billing database, an installment payments database, or a merchant database.

* * * * *